(12) United States Patent
Pettey

(10) Patent No.: US 12,391,397 B2
(45) Date of Patent: Aug. 19, 2025

(54) COLLAPSIBLE FUEL CELLS FOR AIRCRAFT

(71) Applicant: Response Technologies, LLC, Coventry, RI (US)

(72) Inventor: David Allen Pettey, Portsmouth, RI (US)

(73) Assignee: Response Technologies, LLC, Coventry, RI (US)

( * ) Notice: Subject to any disclaimer, the term of this patent is extended or adjusted under 35 U.S.C. 154(b) by 0 days.

(21) Appl. No.: 19/033,472

(22) Filed: Jan. 21, 2025

(65) Prior Publication Data

US 2025/0171158 A1 May 29, 2025

Related U.S. Application Data

(63) Continuation of application No. 18/131,771, filed on Apr. 6, 2023, now Pat. No. 12,269,607.

(51) Int. Cl.
| | |
|---|---|
| *B64D 37/06* | (2006.01) |
| *B64D 37/04* | (2006.01) |
| *H01M 8/00* | (2016.01) |

(52) U.S. Cl.
CPC ............. *B64D 37/06* (2013.01); *B64D 37/04* (2013.01); *H01M 8/002* (2013.01); *H01M 2250/20* (2013.01)

(58) Field of Classification Search
CPC ....... B64D 37/06; B64D 37/04; H01M 8/002; H01M 2250/20
See application file for complete search history.

(56) References Cited

U.S. PATENT DOCUMENTS

| | | | |
|---|---|---|---|
| 2,653,780 A | 9/1953 | Pepersack | |
| 2,736,356 A | 2/1956 | Oates, Jr. | |
| 4,214,721 A * | 7/1980 | Burhans, Jr. ........... | B64D 37/04 220/666 |
| 5,316,611 A | 5/1994 | Moser | |
| 5,371,935 A | 12/1994 | Furs et al. | |
| 2018/0319538 A1 * | 11/2018 | Zaharinov ................ | B32B 1/08 |
| 2022/0024325 A1 | 1/2022 | Pettey et al. | |

FOREIGN PATENT DOCUMENTS

| | | | | |
|---|---|---|---|---|
| CA | 3129775 A1 | 12/2019 | | |
| CN | 113353272 A * | 9/2021 | ............. | B64D 37/32 |
| FR | 2968277 A1 * | 6/2012 | ............. | B64D 37/06 |
| FR | 3033768 A1 * | 9/2016 | ............. | B64D 37/04 |

OTHER PUBLICATIONS

European Exam Report; European Patent Office; Sep. 20, 2024.
European Search Report; European Patent Office; Sep. 10, 2024.

* cited by examiner

*Primary Examiner* — Valentina Xavier
(74) *Attorney, Agent, or Firm* — Lawrence Youst PLLC

(57) ABSTRACT

A collapsible fuel cell for an aircraft includes an inner textile support substrate having an outer surface including one or more textile crease lines forming a fold pattern and an outer shell layer conforming to the outer surface of the textile support substrate to form the fuel cell. The fuel cell is collapsible along the fold pattern formed by the one or more textile crease lines.

20 Claims, 15 Drawing Sheets

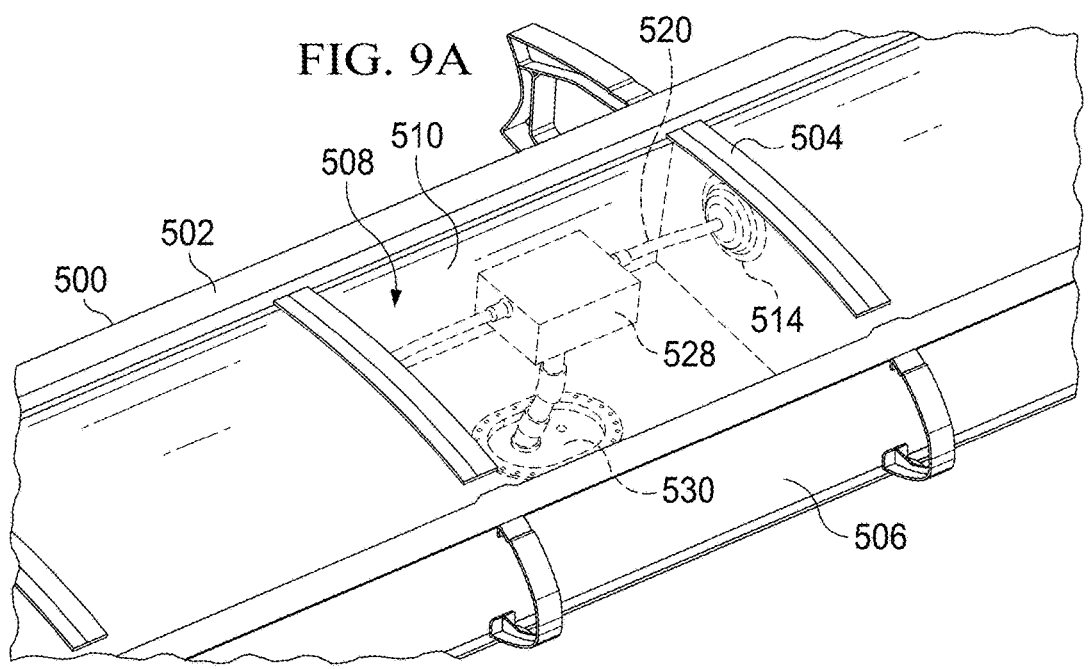
FIG. 9A
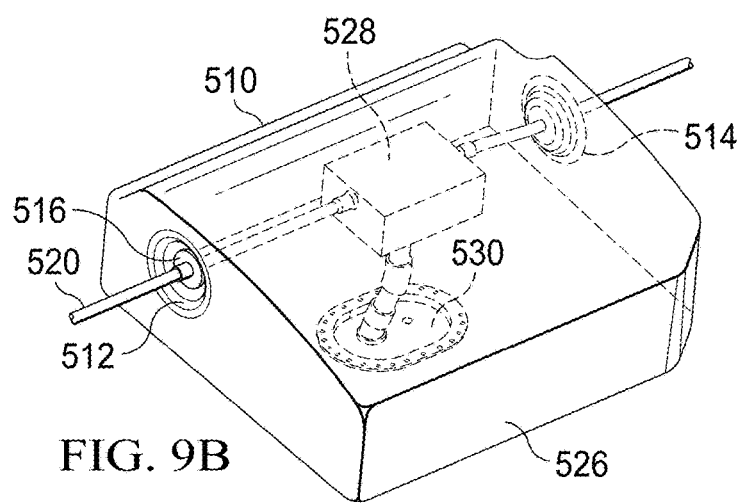
FIG. 9B
FIG. 9C
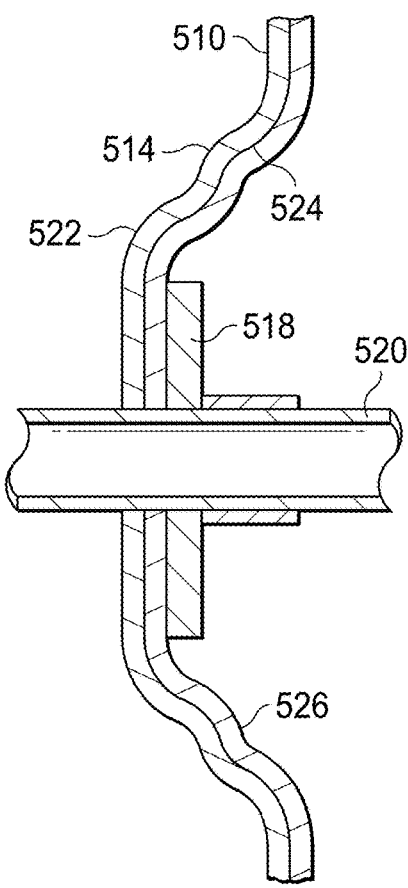
FIG. 9D

COLLAPSIBLE FUEL CELLS FOR AIRCRAFT

CROSS-REFERENCE TO RELATED APPLICATIONS

The present application is a continuation of co-pending application Ser. No. 18/131,771 filed Apr. 6, 2023.

TECHNICAL FIELD OF THE DISCLOSURE

The present disclosure relates, in general, to aircraft fuel systems and, in particular, to aircraft fuel cells that are collapsible along a fold pattern formed by crease lines therein, as well as methods of manufacturing such collapsible fuel cells in processes utilizing a fuel cell mold, a textile support substrate and a shell layer.

BACKGROUND

Fuel cells for the storage of fuel onboard an aircraft may be located in various places on the airframe of the aircraft. For example, fuel cells are commonly installed on the bottom of the fuselage underneath the cabin floor or in the wings of certain tiltrotor aircraft. Aircraft fuel cells are manufactured in a large variety of shapes and sizes using a wide range of materials depending on the requirements and purpose of the aircraft. Natural rubber-based self-sealing fuel cells were introduced in World War II as a lifesaving technology and are still being used onboard military aircraft. Also in wide use today are aircraft fuel cells having rigid side walls. The added weight, cost and production lead times of these previous types of fuel cells have caused military and commercial aircraft manufacturers to demand lighter weight, flexible alternatives that facilitate installation and maintenance servicing.

Because the size, shape and accessibility of fuel cell compartments differ widely across aircraft, current fuel cells cannot be readily mass manufactured across all aircraft platforms. To maximize the limited open space onboard an aircraft, fuel cells are often fit or squeezed into fuel cell compartments with tight clearances. Various fittings and components must also be attached to the fuel cell, further restricting the available space in the fuel cell compartment. Fuel cells with rigid walls are difficult to position and install in tight fuel cell compartments. For example, service connections to fittings on the fuel cell may be difficult to access due to the tight clearance between the rigid wall of the fuel cell and the adjacent wall of the fuel cell compartment. Force fitting fuel cells into tight and confined fuel cell compartments may lead to damage or premature failure of the fuel cell. In addition, over the life of an aircraft, fuel cells must be accessed and removed for replacement or service. Tightly fit fuel cells are difficult to remove for replacement or service, making such fuel cells susceptible to damage during regular maintenance. Accordingly, a need has arisen for aircraft fuel cells that are easier to install and service in tight fuel cell compartments while still meeting the performance requirements for fuel cells necessitated by the aircraft or regulations promulgated by aviation and/or military agencies.

SUMMARY

In a first aspect, the present disclosure is directed to a collapsible fuel cell for an aircraft, the fuel cell including an inner textile support substrate having an outer surface including one or more textile crease lines forming a fold pattern and an outer shell layer conforming to the outer surface of the textile support substrate to form the fuel cell. The fuel cell is collapsible along the fold pattern formed by the one or more textile crease lines.

In some embodiments, the textile support substrate may have a first thickness at the one or more textile crease lines and a second thickness at uncreased regions of the textile support substrate, the second thickness greater than the first thickness. In certain embodiments, the textile support substrate may have a first fabric density at the one or more textile crease lines and a second fabric density at uncreased regions of the textile support substrate, the second fabric density greater than the first fabric density. In some embodiments, the one or more textile crease lines may include intersecting straight lines and/or one or more curvilinear lines. In certain embodiments, the shell layer may include one or more shell crease lines adjacent to the one or more textile crease lines to reinforce the fold pattern. In some embodiments, the shell layer may include a first chemical composition at the one or more shell crease lines and a second chemical composition at uncreased regions of the shell layer, the first chemical composition different from the second chemical composition. In certain embodiments, the shell layer may have a first thickness at the one or more shell crease lines and a second thickness at uncreased regions of the shell layer, the second thickness greater than the first thickness. In some embodiments, the fuel cell may include one or more walls having the fold pattern, and the one or more walls may be inwardly collapsible toward the center of the fuel cell or outwardly collapsible away from the center of the fuel cell. In certain embodiments, the textile support substrate may include a knitted fabric. In some embodiments, the shell layer may include an elastomeric material. In certain embodiments, the fuel cell may include one or more layers of elastomeric material on an inner surface of the textile support substrate.

In a second aspect, the present disclosure is directed to an aircraft including an airframe forming a fuel cell compartment and a collapsible fuel cell disposed inside the fuel cell compartment. The fuel cell includes an inner textile support substrate having an outer surface including one or more textile crease lines forming a fold pattern and an outer shell layer conforming to the outer surface of the textile support substrate to form the fuel cell. The fuel cell is collapsible along the fold pattern formed by the one or more textile crease lines.

In some embodiments, the aircraft may include a fuselage including the fuel cell compartment, the fuel cell disposed in the fuselage fuel cell compartment. In other embodiments, the aircraft may include a fuselage and a wing coupled to the fuselage and including the fuel cell compartment, the fuel cell disposed in the wing fuel cell compartment. In certain embodiments, the fuel cell may be biased toward a collapsed state when empty of fuel.

In a third aspect, the present disclosure is directed to a method of manufacturing a collapsible fuel cell for an aircraft, the method including providing a fuel cell mold having an outer surface including one or more mold crease lines, applying a textile support substrate having one or more textile crease lines on the fuel cell mold such that the one or more textile crease lines are adjacent to the one or more mold crease lines, applying a shell layer onto the textile support substrate and removing the fuel cell mold to form the fuel cell. The fuel cell is collapsible along a fold pattern formed by the one or more textile crease lines.

In certain embodiments, the method may include applying one or more layers of elastomeric material on the fuel cell mold. In such embodiments, applying the textile support substrate on the fuel cell mold may include applying the textile support substrate on the one or more layers of elastomeric material. In some embodiments, providing the fuel cell mold may include 3D printing the fuel cell mold. In certain embodiments, 3D printing the fuel cell mold may include 3D printing a plurality of fuel cell mold segments and assembling the fuel cell mold segments into the fuel cell mold. In some embodiments, providing the fuel cell mold may include providing the fuel cell mold having one or more creased walls with a convex outer surface including the one or more mold crease lines. In such embodiments, the method may include collapsing the fuel cell such that one or more creased walls of the fuel cell collapse outwardly away from the center of the fuel cell. In certain embodiments, providing the fuel cell mold may include providing the fuel cell mold having one or more creased walls with a concave outer surface including the one or more mold crease lines. In such embodiments, the method may include collapsing the fuel cell such that one or more creased walls of the fuel cell collapse inwardly toward the center of the fuel cell. In some embodiments, the method may include knitting the textile support substrate to form a prefitted fabric. In such embodiments, applying the textile support substrate may include covering the fuel cell mold with the prefitted fabric. In certain embodiments, applying the shell layer may include spray coating the shell layer onto the textile support substrate. In some embodiments, applying the shell layer may include applying the shell layer including one or more shell crease lines onto the textile support substrate such that the one or more shell crease lines are adjacent to the one or more textile crease lines, thereby reinforcing the fold pattern. In certain embodiments, the method may include collapsing the fuel cell along the fold pattern, installing the collapsed fuel cell into a fuel cell compartment of the aircraft and filling the fuel cell with fuel to expand the fuel cell.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 9A-9D are various views of a fuel cell having extensible fitting regions in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
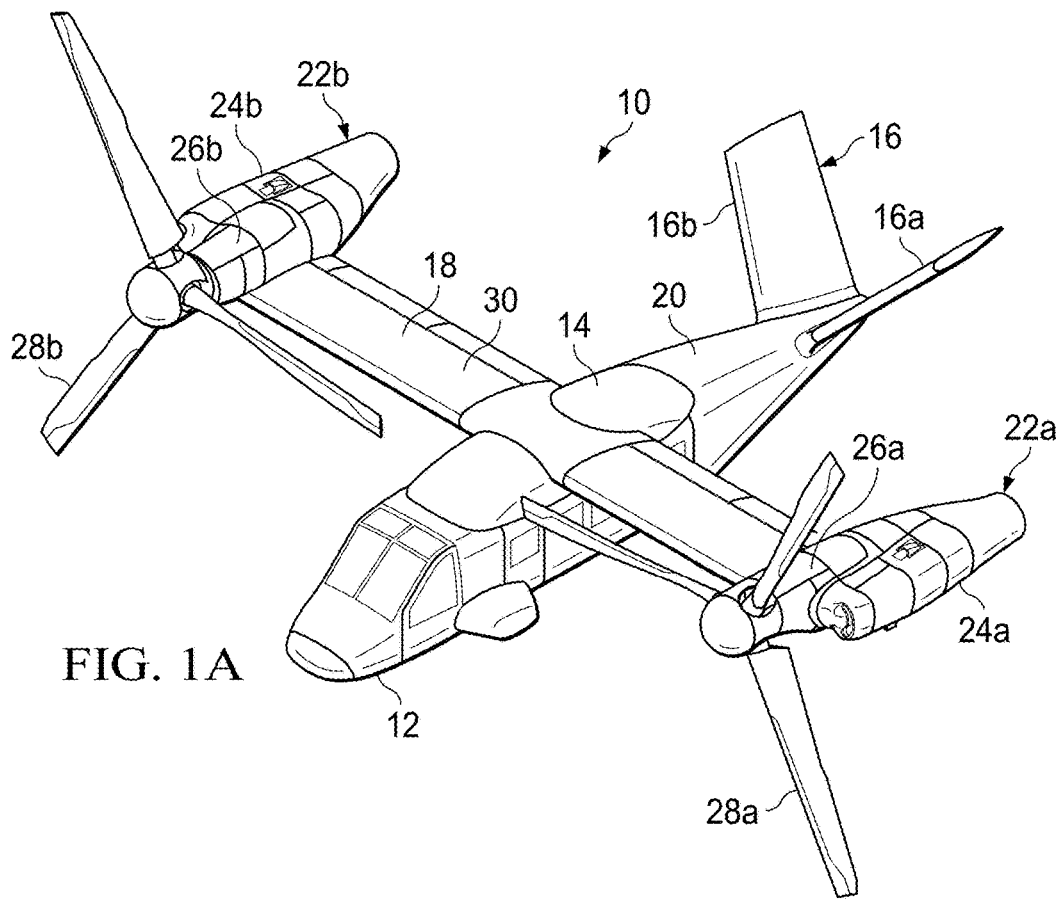
FIGS. 1A-1B are schematic illustrations of a tiltrotor aircraft having collapsible fuel cells in accordance with embodiments of the present disclosure.
Figure 1B:
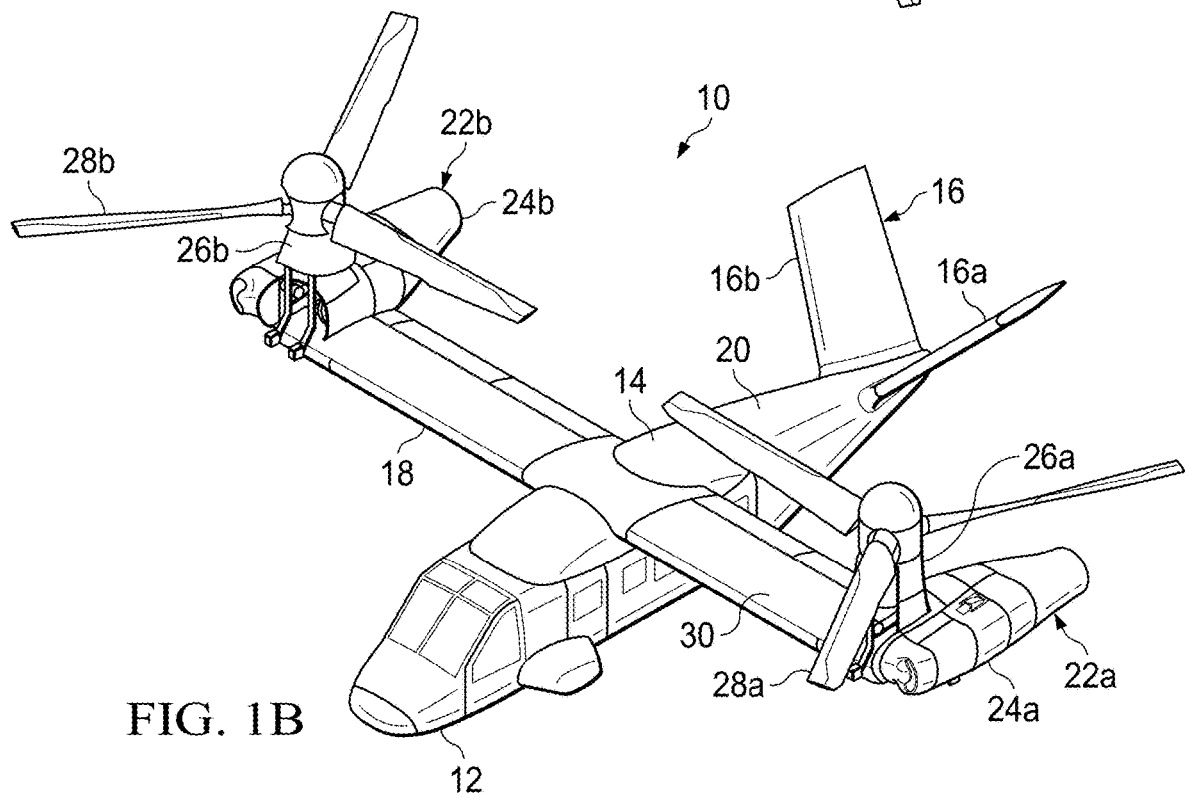

Referring to FIGS. 1A-1B in the drawings, a tiltrotor aircraft is schematically illustrated and generally designated 10. Tiltrotor aircraft 10 includes a fuselage 12, a wing mount assembly 14 and a tail section 16 including rotatably mounted tail members 16a, 16b having control surfaces operable for horizontal and/or vertical stabilization during forward flight. A wing 18 is supported by fuselage 12. Fuselage 12 and wing 18 are supported by an airframe 20, which includes skin and internal support structure such as beams or scaffolding. Located at outboard ends of wing 18 are propulsion assemblies 22a, 22b. Propulsion assembly 22a includes a fixed nacelle 24a that houses an engine and a transmission. In addition, propulsion assembly 22a includes a pylon assembly 26a that is rotatable relative to fixed nacelle 24a between a generally horizontal orientation as best seen in FIG. 1A and a generally vertical orientation as best seen in FIG. 1B. Propulsion assembly 22a also includes a proprotor assembly 28a that is rotatable relative to pylon assembly 26a responsive to torque and rotational energy provided by a rotor hub assembly and drive system mechanically coupled to the engine and transmission housed by fixed nacelle 24a. Similarly, propulsion assembly 22b includes a fixed nacelle 24b that houses an engine and transmission, a pylon assembly 26b that is rotatable relative to fixed nacelle 24b and a proprotor assembly 28b that is rotatable relative to pylon assembly 26b responsive to torque and rotational energy provided via a rotor hub assembly and drive system mechanically coupled to the engine and transmission housed by fixed nacelle 24b.

FIG. 1A illustrates tiltrotor aircraft 10 in airplane or forward flight mode, in which proprotor assemblies 28a, 28b are rotating in a substantially vertical plane to provide a forward thrust enabling wing 18 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 28a, 28b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 28a, 28b are selectively positioned between forward flight mode and VTOL flight mode, which can be referred to as a conversion flight mode. Even though tiltrotor aircraft 10 has been described as having one engine in each fixed nacelle 24a, 24b, it should be appreciated by those having ordinary skill in the art that other engine arrangements are possible and are considered to be within the scope of the present disclosure including, for example, alternatively or additionally having an engine housed within fuselage 12 that provides torque and rotational energy to both proprotor assemblies 28a, 28b.

Figure 2A:
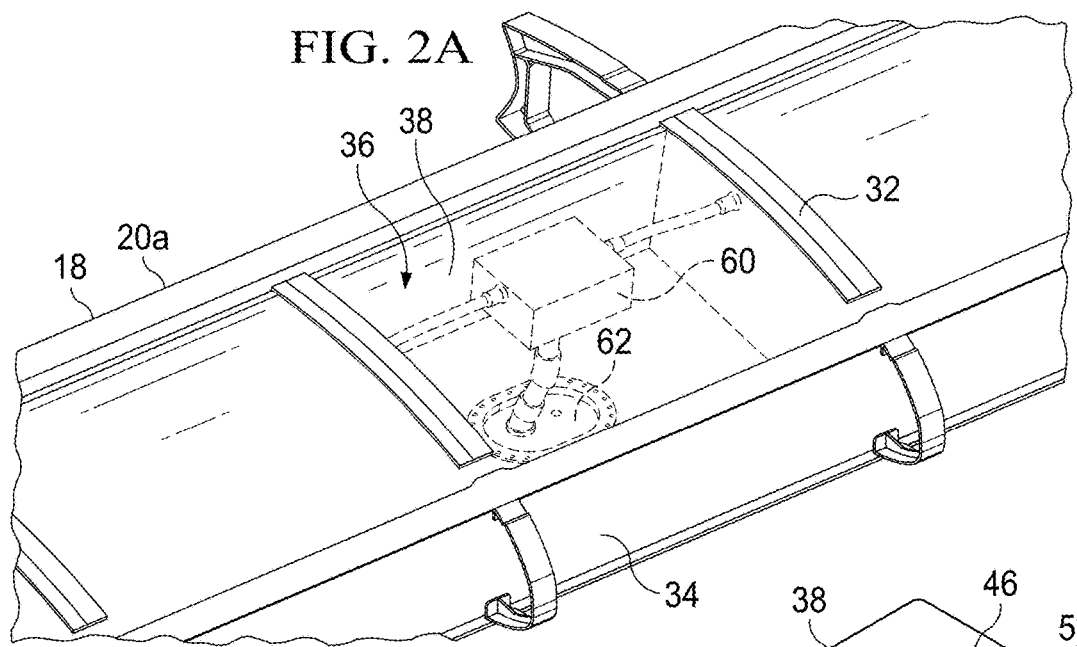
FIGS. 2A-2E are various views of a collapsible fuel cell for a tiltrotor aircraft in accordance with embodiments of the present disclosure.
Figure 2B:
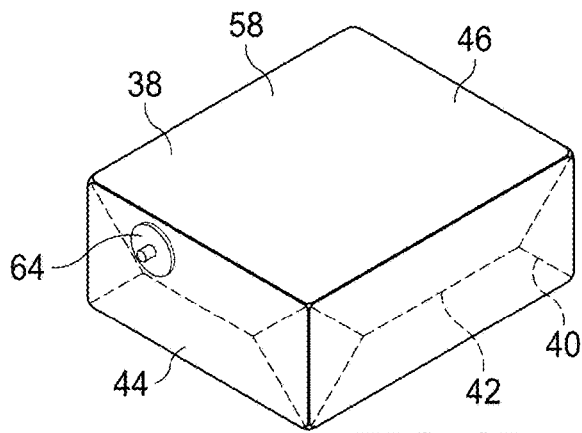
Figure 2C:
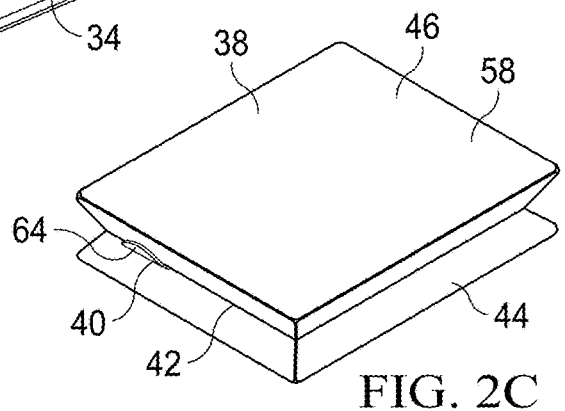
Figure 2D:
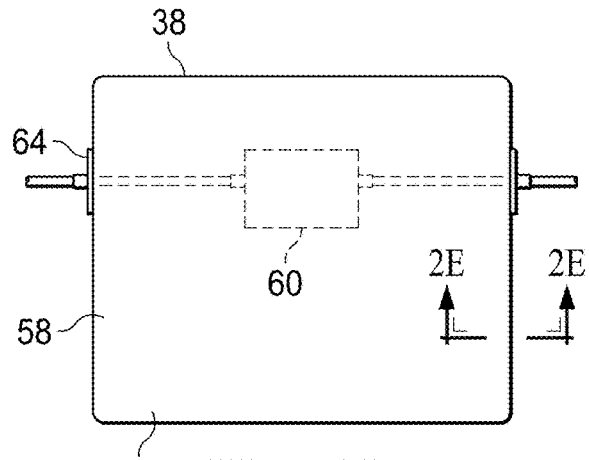
Figure 2E:
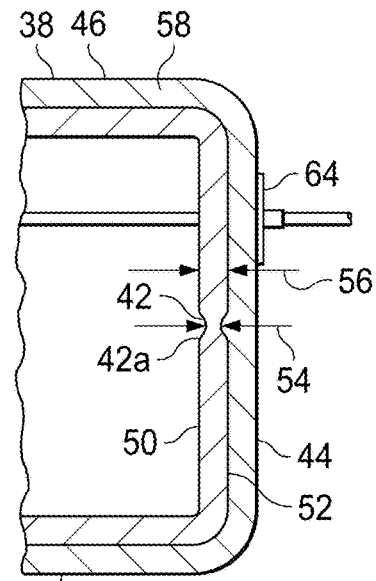

Referring additionally to FIGS. 2A-2E in the drawings, wing 18 is supported by wing airframe 20a, which includes wing skin 30 and internal support structure such as ribs 32 and spars 34. Wing airframe 20a forms multiple fuel cell compartments including fuel cell compartment 36 in which fuel cells such as wing auxiliary tanks may be installed. Previous types of fuel cells such as rigid fuel tanks are difficult to install and service in tight fuel cell compartments such as fuel cell compartment 36, and are highly susceptible to damage during installation, maintenance and removal processes, which may lead to fuel leaks, premature failure or other hazards. For example, service connections to fittings on previous fuel cells may be difficult to access due to the tight clearance between the rigid wall of the fuel cell and the bounding ribs 32 or spars 34 of fuel cell compartment 36. Rigid fuel tanks also cannot be compressed for packing, shipping or storage. To address the need for fuel cells that are easier to install and service in tight fuel cell compartments while still meeting certain performance requirements, tiltrotor aircraft 10 includes a collapsible fuel cell 38. Fuel cell 38 may also be referred to as a collapsible fuel bladder, bag or tank. For sake of efficiency, certain features will be disclosed only with regard to fuel cell 38 installed in fuel cell compartment 36. One having ordinary skill in the art, however, will fully appreciate an understanding of other fuel cells installed in wing airframe 20a based upon the disclosure herein of fuel cell 38. Fuel cell 38 collapses in a precise and predesigned manner along a fold pattern 40 formed by crease, or fold, lines 42 within fuel cell 38 that function as living hinges. FIG. 2B shows fuel cell 38 in an expanded state filled with fuel or pressure and FIG. 2C shows fuel cell 38 in a collapsed state. Fuel cell 38 includes lateral walls 44, top wall 46 and bottom wall 48. In the illustrated embodiment, lateral walls 44 include crease lines 42 that form fold pattern 40, and lateral walls 44 collapse inwardly toward the center of fuel cell 38. In other embodiments, crease lines 42 may be formed on any combination of lateral walls 44, top wall 46 and/or bottom wall 48 such as on less than all of lateral walls 44 or on only top and bottom walls 46, 48. Depending on the embodiment, the walls of fuel cell 38 that include crease lines 42 may collapse inwardly toward the center of fuel cell 38 or outwardly away from the center of fuel cell 38. Crease lines 42 are illustrated as intersecting straight lines that form fold pattern 40, with each lateral wall 44 including a central bisecting crease line interposed between two sets of diagonal crease lines, each set approximating a triangular shape. Crease lines 42 may alternatively or additionally include curvilinear lines, arcs or shapes.

Fuel cell 38 includes an inner textile support substrate 50 having an outer surface 52 and including textile crease lines 42a along fold pattern 40. Thickness 54 of textile support substrate 50 at textile crease lines 42a is less than thickness 56 of textile support substrate 50 at uncreased regions of textile support substrate 50 to increase the flexibility of textile support substrate 50 at textile crease lines 42a. Fuel cell 38 also includes an outer shell layer 58 conforming to outer surface 52 of textile support substrate 50. Shell layer 58 may be a flexible or elastomeric material that is bendable along crease lines 42.

Because fuel cell 38 can be repeatedly and consistently collapsed along engineered crease lines 42, fuel cell 38 can be uniquely predesigned to fit into tight spaces such as fuel cell compartment 36, thereby reducing the propensity for damage to fuel cell 38. More particularly, fuel cell 38 may be collapsed as shown in FIG. 2C prior to being installed into fuel cell compartment 36. Fuel cell 38 is also easier to maintain since fuel cell 38 may be collapsed prior to servicing and/or removal. The collapsibility of fuel cell 38 also lessens the difficulty by which components and fittings such as fuel pump 60, sump plate 62 and/or fuel hose fittings 64 are attached to fuel cell 38. For example, fuel cell 38 may be fully or partially collapsed while residing in fuel cell compartment 36 to allow for easier access to such components and fittings during installation, servicing or removal. Fuel cell 38 thus reduces installation and servicing cycles, thereby improving fleet readiness levels. Fuel cell 38 in its collapsed state has a reduced volume footprint for space saving packaging while being shipped or stored, thus providing logistical benefits in both commercial and military applications. Fuel cell 38 flexibly lends itself to a wide range of manufacturing processes that may be used to enhance the installability, serviceability, flexibility, collapsibility, crashworthiness and/or ballistic tolerance of fuel cell 38. In the illustrated embodiment, fuel cell 38 is depicted with test cube dimensions to better illustrate certain features of the illustrative embodiments. It will be appreciated by one of ordinary skill in the art, however, that fuel cell 38 may form any shape suitable for the aircraft, fuel cell compartment and/or mission for which the fuel cell is intended. While fuel cell 38 is shown as a wing auxiliary tank disposed in wing 18, the collapsible fuel cells of the illustrative embodiments including fuel cell 38 may be located in any portion of tiltrotor aircraft 10 for which fuel storage is feasible such as fuselage 12.

It should be appreciated that tiltrotor aircraft 10 is merely illustrative of a variety of aircraft that can implement the embodiments disclosed herein. Indeed, fuel cell 38 may be implemented on any aircraft that requires fuel. Other aircraft implementations can include helicopters, hybrid aircraft, tiltwing aircraft, quad tiltrotor aircraft, unmanned aircraft, gyrocopters, propeller-driven airplanes, compound helicopters, jets, drones and the like. As such, those skilled in the art will recognize that fuel cell 38 can be integrated into a variety of aircraft configurations. It should be appreciated that even though aircraft are particularly well-suited to implement the embodiments of the present disclosure, non-aircraft vehicles and devices such as land or water vehicles can also implement the embodiments.

Figure 3A:
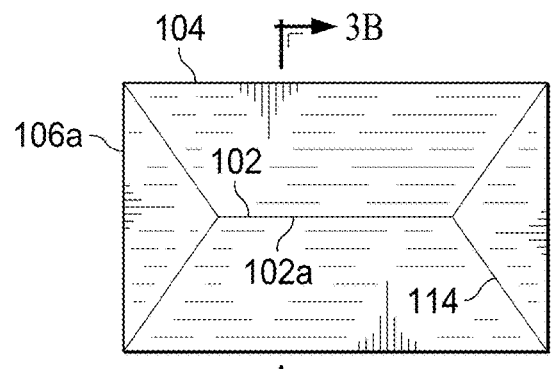
FIGS. 3A-3H are various views of a collapsible fuel cell being produced in a sequential manufacturing process in accordance with embodiments of the present disclosure.
Figure 3B:
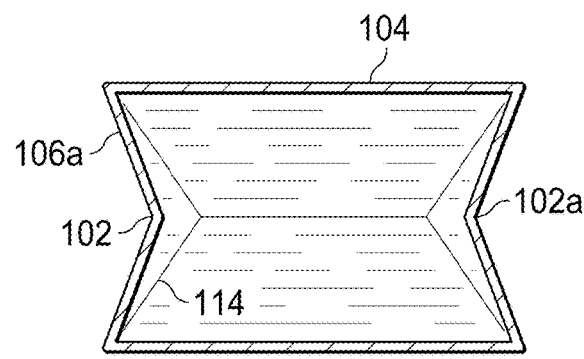
Figure 3C:
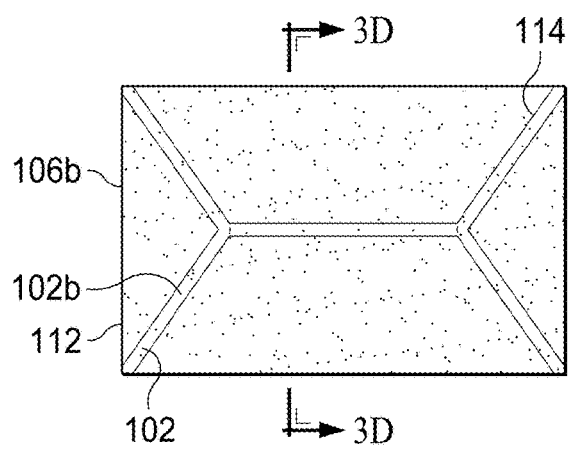
Figure 3D:
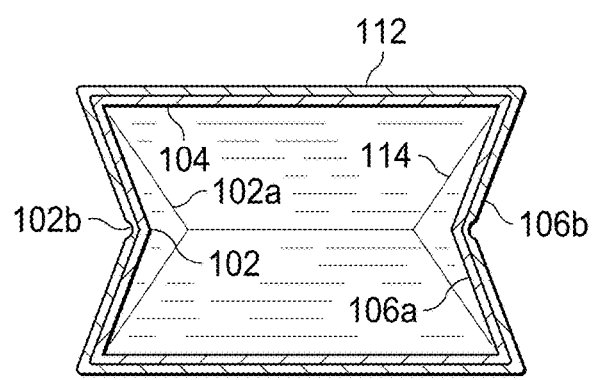
Figure 3E:
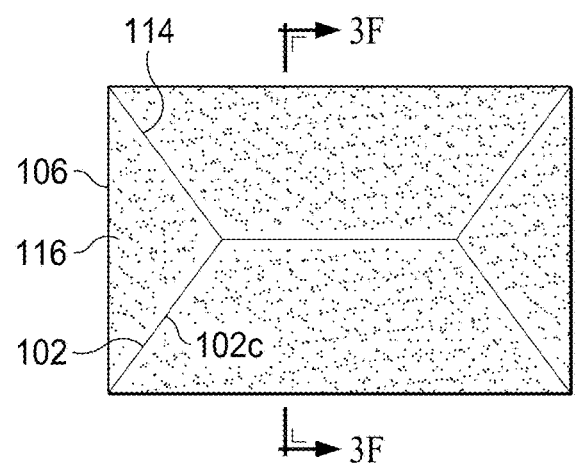
Figure 3F:
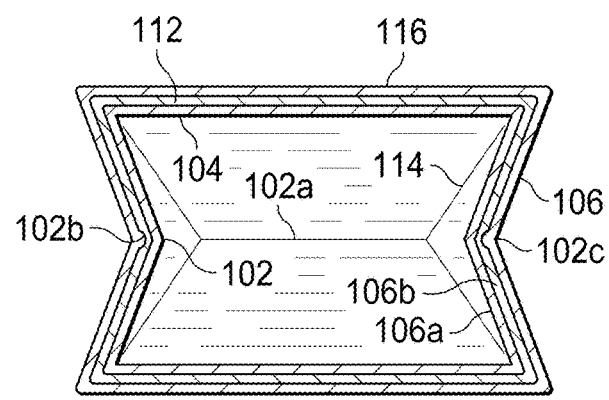
Figure 3G:
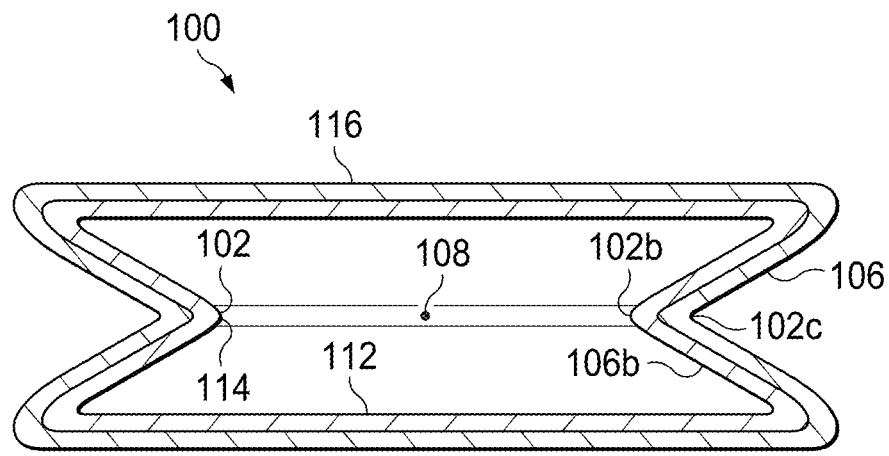

Referring to FIGS. 3A-3H in the drawings, a manufacturing process for the production of collapsible fuel cell 100 with crease lines 102 is depicted. While the manufacturing process is shown to have a particular sequence of steps, it will be appreciated that the steps shown therein may occur out of the illustrated or described order depending on the embodiment and/or application. In other embodiments, one or more illustrated or described steps may be omitted. For ease of reference, fuel cell 100 is shown to have a test cube shape similar to fuel cell 38 in FIGS. 2A-2E, although fuel cell 100 may be manufactured to form a wide variety of shapes. As shown in FIGS. 3A-3B, the manufacturing process begins with a fuel cell mold 104 having engineered mold crease lines 102a. Fuel cell mold 104 acts as an inner mold atop which fuel cell 100 may be layered, after which fuel cell mold 104 is removed or destroyed. Thus, fuel cell mold 104 is not part of the finished fuel cell 100 that is installed in the aircraft. Once the locations, dimensions and configuration of crease lines 102 for fuel cell 100 have been determined, designed or engineered, crease lines 102 are incorporated into the design of fuel cell mold 104 in the form of mold crease lines 102a. As best seen in FIG. 3G, lateral walls 106 of fuel cell 100 are creased walls that collapse inwardly toward center 108 of fuel cell 100. To help initiate the eventual collapse of lateral walls 106 of fuel cell 100, lateral walls 106a of fuel cell mold 104 are creased, bumped-in walls with a concave outer surface as best seen in FIG. 3B. Referring additionally to FIGS. 4A-4B in the drawings, another embodiment of fuel cell mold 104 is depicted as fuel cell mold 104a in which the lateral walls thereof are creased, bumped-out walls with a convex outer surface having mold crease lines. In the example of fuel cell mold 104a, the lateral walls of the finished fuel cell collapse outwardly away from the center of the fuel cell. In this manner, the inward, outward or other shape formed by the creased walls of fuel cell molds 104, 104a bias the direction in which the corresponding walls of the finished fuel cell collapse.

Figure 4A:
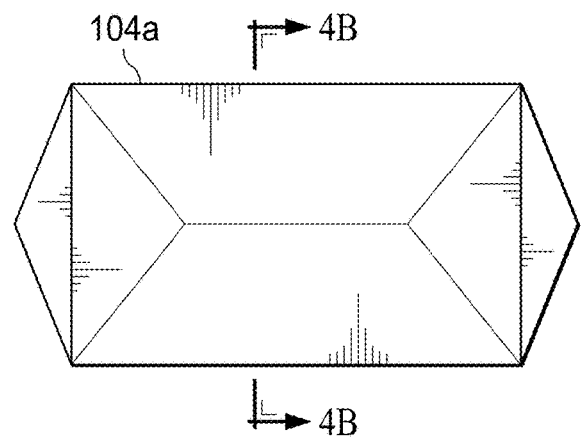
FIGS. 4A-4C are various views of a fuel cell mold in a manufacturing process for collapsible fuel cells in accordance with embodiments of the present disclosure.
Figure 4B:
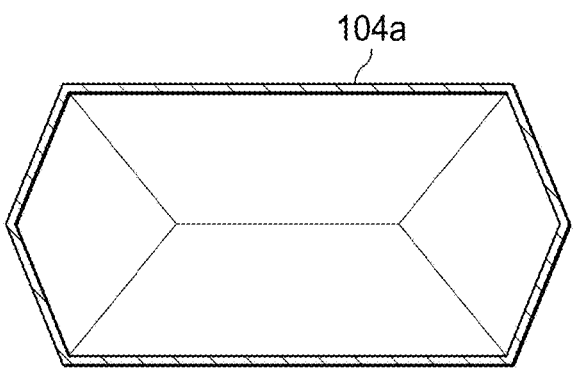
Figure 4C:
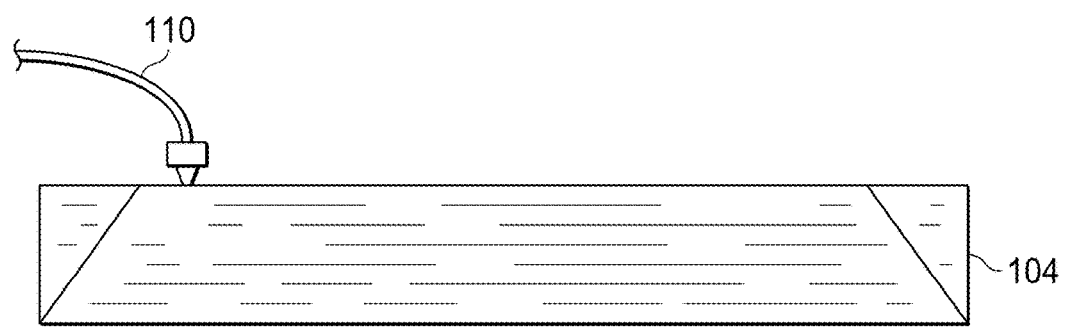

Fuel cell mold 104 may be manufactured using a wide variety of additive, subtractive or formative manufacturing techniques including, but not limited to, extrusion, machining, 3D printing, stamping, welding or casting as well as others. Referring additionally to FIG. 4C in the drawings, in the illustrated embodiment fuel cell mold 104 is 3D printed by a 3D printer 110. Fuel cell mold 104 may be 3D printed using polylactic acid (PLA), acrylonitrile butadiene styrene (ABS), Nylon or a wide variety of other 3D printable materials using a range of different 3D printing technologies such as fused deposition modeling (FDM) or stereolithography (SLA). In some embodiments, a plurality of fuel cell mold segments may be 3D printed and subsequently assembled to form fuel cell mold 104. For example, fuel cell mold 104 may be 3D printed as two cupped halves joined together to form fuel cell mold 104, thereby avoiding the need for struts or other internal supports. The ability to form fuel cell mold 104 from fuel cell mold segments may also help to overcome size or other constraints of 3D printing technology.

Referring to FIGS. 3C-3D, after fuel cell mold 104 has been 3D printed or otherwise provided, a textile support substrate 112 having textile crease lines 102b is applied onto the outer surface of fuel cell mold 104 such that textile crease lines 102b line up with, or are otherwise adjacent to, mold crease lines 102a. The coinciding and complementary positioning of mold crease lines 102a and textile crease lines 102b reinforce folding pattern 114 along which fuel cell 100 collapses. In some embodiments, an adhesive may be applied between fuel cell mold 104 and textile support substrate 112 so that textile support substrate 112 better conforms to the shape of fuel cell mold 104. For example, lateral walls 106b of textile support substrate 112 may be adhered to the concave, bumped-in lateral walls 106a of fuel cell mold 104 for a more conforming fit therebetween, further reinforcing fold pattern 114. In certain embodiments, one or more layers, or coatings, of elastomeric material may be applied on fuel cell mold 104 before textile support substrate 112 is applied such that the one or more layers of elastomeric material are interposed between fuel cell mold 104 and textile support substrate 112. In such embodiments, adhesive may be applied between fuel cell mold 104 and the one or more layers of elastomeric material so that the one or more layers of elastomeric material better conform to fuel cell mold 104.

In some embodiments, textile support substrate 112 may be a knitted, or woven, fabric formed of composite material(s) that is prefitted to cover fuel cell mold 104. In certain embodiments, textile support substrate 112 may be knitted as a single piece that is near net shape off of the knitting machine and subsequently stretched and placed over fuel cell mold 104. In some embodiments, textile support substrate 112 may be formed from composite materials that include numerous material plies composed of natural or synthetic and continuous or chopped filaments or fibers including one or more of glass, fiberglass, Kevlar, quartz, polyester, ceramics, polypropylene, carbon, graphite, basalt, aromatic polyamide materials or the like or any combination thereof. The material plies which form textile support substrate 112 may be in the form of braids, fibers, threads or strands or fabrics such as veil mats, short fiber mats, multiaxial cloth such as biaxial or triaxial cloth, woven fabrics, tape such as unidirectional tape and the like. Plies or individually-placed fibers may be joined together with a resin such as a polymeric matrix including thermoplastic or thermosetting resins or any suitable resin system such as epoxies, polyimides, polyamides, bismaleimides, polyesters, vinyl esters, polyurethane, phenolics, polyetheretherketones (PEEK), polyetherketones (PEK), polyphenylene sulfides (PPS) and the like. The resins may originate as a liquid and polymerize during the cure process and harden. Fabric that is preimpregnated with resin, or prepreg, may also be used to manufacture textile support substrate 112. The weight ratio of fibers to resin can range from 20% fibers and 80% resin to 70% fibers and 30% resin, although other ratios are within the scope of the illustrative embodiments. Higher and/or continuous fiber content can provide enhanced strength and stiffness. Fibers, whether individually placed or in sheet form, can be orientated in any direction such as 0, 45 or 90 degrees relative to a reference axis, as in some braided plies, to provide desired strength characteristics such as torsional stiffness. For example, braided off-axis fibers may be integrated to reinforce strength in an off-axis direction. The use of composite materials provides the ability to tailor the combination of fibers and resin to meet design requirements of fuel cell 100 such as stiffness or flexibility.

Textile support substrate 112 has a geometry that enables a broadcloth, or broad goods, construction process such as a single layup and single cure. In other embodiments, textile support substrate 112 may be formed using a broadcloth and/or layered tape construction process having a manual or automated layup of a plurality of composite broad goods material layers such as fiberglass fabric, carbon fabric, fiberglass tape, carbon tape and combinations thereof positioned over fuel cell mold 104, thus forming a laminate stack. In one non-limiting example, the composite material of textile support substrate 112 may be wound or braided on a rotisserie to cover fuel cell mold 104. The structure of fuel cell 100 allows for an entirely automated broad goods layup or the combination of an automated and a manual broad goods layup. Even though particular methods of manufacture and composites have been described herein, it should be understood by those having ordinary skill in the art that other methods of manufacture and composites could alternatively or additionally be used to produce or apply textile support substrate 112.

In one example, textile support substrate 112 may be formed using a layup process wherein a plurality of plies, which may be preimpregnated with an uncured resin, are placed on fuel cell mold 104. The plies may have the same or different shapes, may be the same or different materials, may have the same or different fabric weaves, may have the same or different thicknesses, may be continuous or discontinuous, may extend beyond the periphery of fuel cell mold 104 or be fully within the periphery of fuel cell mold 104, may be oriented in the same or different directions and/or may have other similarities or differences. In one embodiment, the plies may be an intermediate modulus epoxy resin impregnated carbon fiber fabric that is stiffer than conventional composite fabrics, thereby allowing for fewer plies and reducing the weight and manufacturing cost. Each fabric layer is considered a ply of the laminate with the total number of plies ranging from between a single ply to 100 or more plies. Any number of composite layers or plies may be used to form textile support substrate 112. In some embodiments, each ply of textile support substrate 112 may have ends that are butt-spliced to one another to form a closed loop. In yet other embodiments, the composite layers of textile support substrate 112 may be applied using a spray layup process with overlapped splices.

Following layup of the plies of textile support substrate 112, in some embodiments the plies may be compacted, or debulked, to remove any pockets of air and to provide adequate attachment therebetween. The compacting step can be achieved by applying a vacuum to the plies in the mold, by pressurization or by pressing a second mold member or roller on the plies. Compacting not only consolidates the layup but also removes air trapped in the resin matrix that would otherwise create undesirable voids (air pockets) in the laminate that could weaken textile support substrate 112. After the plies are compacted, the plies of textile support substrate 112 may be cured to form a laminate by heating and/or pressurizing the plies. In the curing process, textile support substrate 112 may be inserted into an autoclave, which is a pressure chamber used to carry out industrial and scientific processes requiring elevated temperature and pressure in relation to ambient temperature and pressure. Following the curing process, the laminate may be trimmed or otherwise machined as desired. After curing, the composite material layers form a high strength, lightweight composite textile support substrate 112.

In some embodiments, the fabric density at textile crease lines 102b is less than the fabric density at uncreased regions of textile support substrate 112, thereby facilitating the foldability of fuel cell 100 along textile crease lines 102b. In certain embodiments, textile crease lines 102b may be formed by skipping, dropping or removing one, two or more needles of the knitting machine at textile crease lines 102b for a wide or narrow demarcation as desired. In the illustrated embodiment, textile support substrate 112 is thinner at textile crease lines 102b than at uncreased regions of textile support substrate 112, which facilitates the foldability of fuel cell 100 along textile crease lines 102b. In one non-limiting example, textile crease lines 102b may be in a range between 25 percent and 33 percent thinner than uncreased regions of textile support substrate 112. In other embodiments, the fabric structure or material composition of textile crease lines 102b may differ from the fabric structure or material composition of uncreased regions of textile support substrate 112 to facilitate the foldability of fuel cell 100 along textile crease lines 102b. In yet other embodiments, the fabric density, thickness, fabric structure and material composition of textile support substrate 112 at textile crease lines 102b may be the same as the fabric density, thickness, fabric structure and material composition of uncreased regions of textile support substrate 112, and textile crease lines 102b may be thus formed by contact between textile support substrate 112 and fuel cell mold 104.

Figure 5:
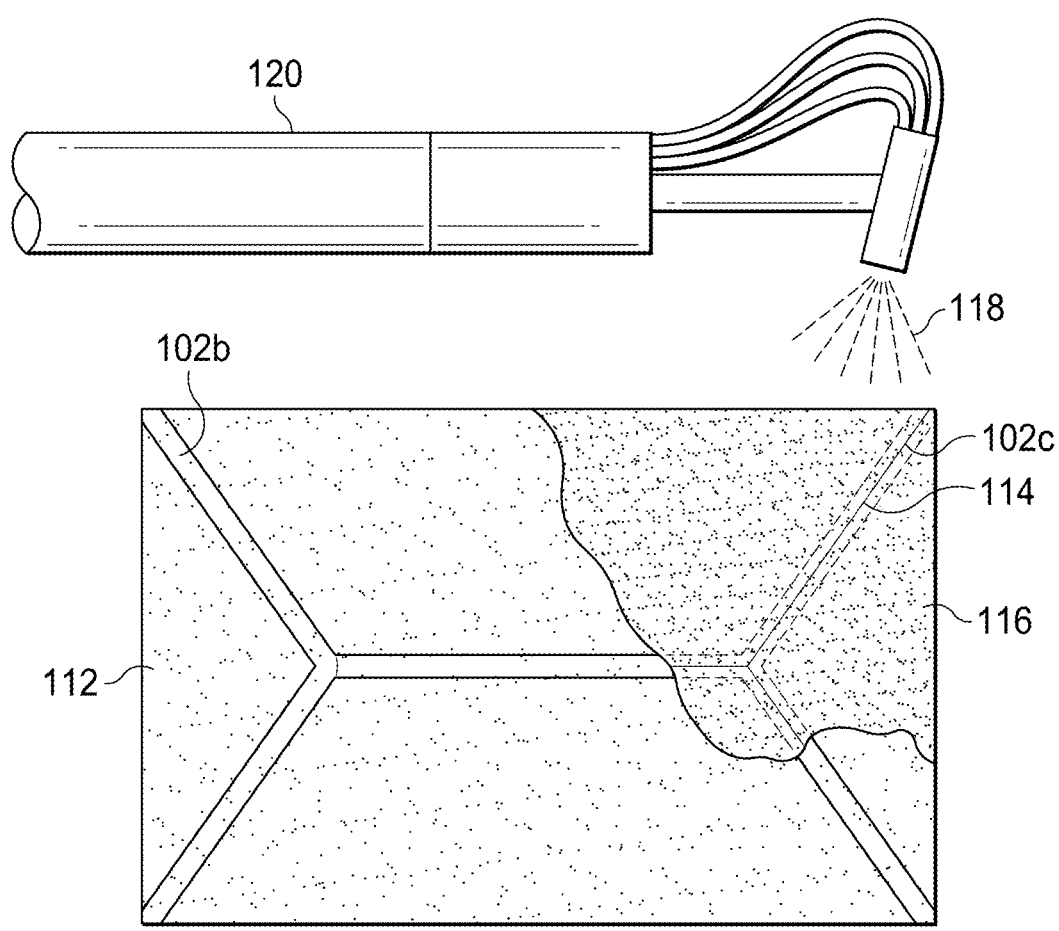
FIG. 5 is a side view of a collapsible fuel cell undergoing a spray coating step in a manufacturing process in accordance with embodiments of the present disclosure.

Referring to FIGS. 3E-3F, an outer shell layer 116 is applied on textile support substrate 112 in the illustrative manufacturing process. Shell layer 116 is formed from an elastomeric material with sufficient elasticity to enable fuel cell 100 to collapse and expand without forming cracks or other structural discontinuities therein. Referring additionally to FIG. 5 in the drawings, shell layer 116 may be spray coated on textile support substrate 112. In the illustrated embodiment, elastomeric material 118 is in the process of being robotically spray coated on textile support substrate 112 by a spray coating machine 120, although in other embodiments elastomeric material 118 may be manually applied on textile support substrate 112. In some embodiments, shell layer 116 may be applied so as to have a uniform thickness and material composition over the entirety of textile support substrate 112, including over textile crease lines 102b. In such embodiments, textile crease lines 102b as pre-formed by fuel cell mold 104 act as the primary biasing force for fuel cell 100 to collapse along crease lines 102.

In other embodiments, shell layer 116 may itself include shell crease lines 102c, and the material composition and/or the thickness of elastomeric material 118 at shell crease lines 102c may be varied as compared to uncreased portions of shell layer 116 to customize the foldability of fuel cell 100. As best seen in FIG. 5, shell crease lines 102c are lined up and adjacent to textile crease lines 102b of textile support substrate 112, thereby reinforcing fold pattern 114 of fuel cell 100. In embodiments in which the chemical composition of shell layer 116 at shell crease lines 102c differs from the chemical composition of the uncreased portions of shell layer 116, the chemical compositions at both shell crease lines 102c and the uncreased portions of shell layer 116 may be varied to increase or decrease the rigidity of shell layer 116 for different levels of flexibility of shell layer 116 at shell crease lines 102c or overall. In such embodiments, more flexible chemical compositions may be sprayed at shell crease lines 102c and more rigid chemical compositions may be sprayed at the uncreased portions of shell layer 116. For example, the chemical composition of shell layer 116 at shell crease lines 102c may break at 600-800 percent elongation and the chemical composition of the uncreased portions of shell layer 116 may be stiffer and break at 250-400 percent elongation while still maintaining the same toughness for all areas to enhance fuel cell survivability. In embodiments in which shell layer 116 is thinner at shell crease lines 102c than at the uncreased portions of shell layer 116, a uniform chemical composition may be sprayed on textile support substrate 112 but less may be sprayed at shell crease lines 102c. In other examples, both the chemical composition and amount of material at shell crease lines 102c may be different from the chemical composition and amount of material applied at the uncreased portions of shell layer 116. The manufacturing step of applying shell layer 116 allows for the synergistic use of flexible, high strength to performance ratio raw materials, and such materials may be increased, decreased and/or substituted via a precise robotically or nonrobotically controlled application. In other embodiments, additional layers may be applied to fuel cell 100 on top of shell layer 116 so that shell layer 116 is no longer the outermost layer of fuel cell 100. Such additional layers or shell layer 116 itself may include performance enhancing layers such as fuel barrier layers, self-sealing layers and/or ballistic protection layers. Performance enhancing layers may also be interposed between textile support substrate 112 and shell layer 116. In yet other embodiments, fuel cell 100 may be formed without textile support substrate 112, in which case one or more layers of elastomeric material and/or shell layer 116 may be applied on fuel cell mold 104 without textile support substrate 112.

Figure 3H:
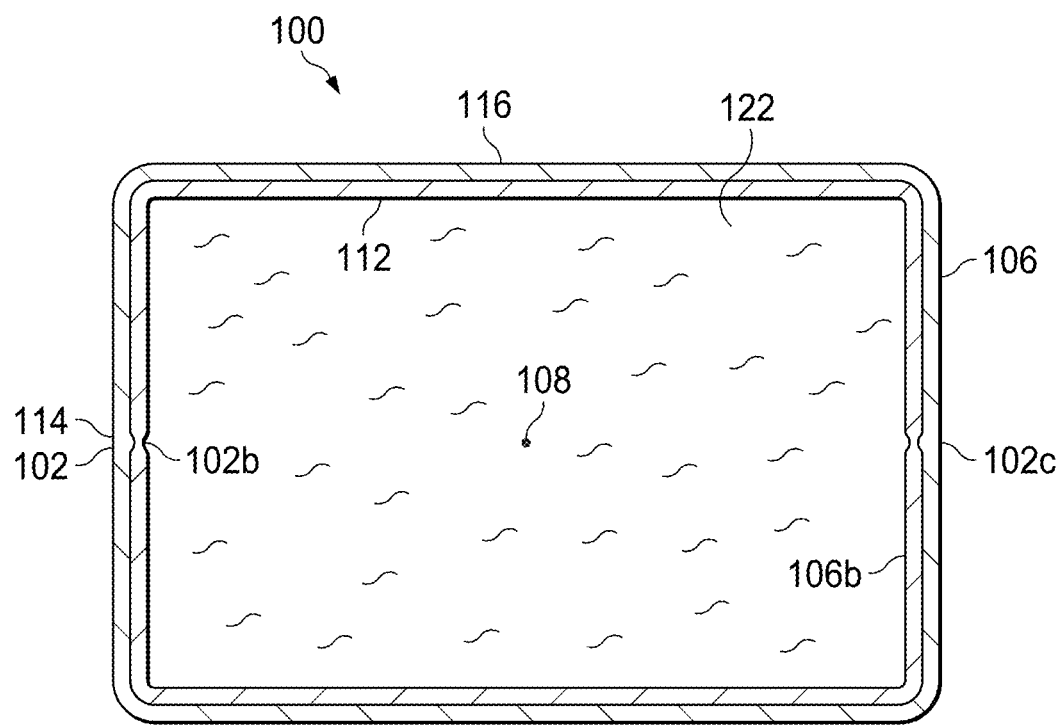

In FIGS. 3G-3H, fuel cell mold 104 has been removed in the manufacturing process to form fuel cell 100. In removing fuel cell mold 104 from inside of textile support substrate 112 and shell layer 116, fuel cell mold 104 may be dismantled for future or repeat use or destructively removed for a one-time use of fuel cell mold 104. For example, in embodiments in which fuel cell mold 104 is formed from 3D printed fuel cell mold segments, fuel cell mold 104 may be removed from inside of textile support substrate 112 and shell layer 116 one segment at a time. Textile support substrate 112 and shell layer 116 retain a material memory of folding pattern 114 pre-biased by fuel cell mold 104, aided at least in part by textile crease lines 102b and shell crease lines 102c. FIG. 3G shows fuel cell 100 in a collapsed state empty or partially empty of fuel 122 and FIG. 3H shows fuel cell 100 in an expanded state full of fuel 122. In the illustrated embodiment, fuel cell 100 is biased toward a collapsed state folded along folding pattern 114 when empty of fuel 122. Lateral walls 106 inwardly collapse toward center 108 of fuel cell 100. Fuel cell 100 is installed into a fuel cell compartment of an aircraft such as fuel cell compartment 36 in FIG. 2A while in the collapsed state. As fuel 122 or other pressure is added to the inside of fuel cell 100, fuel cell 100 expands, or inflates, to the final and expanded shape shown in FIG. 3H, which is engineered to fill the fuel cell compartment for which fuel cell 100 is intended. The final and expanded shape of fuel cell 100 may be at least partially constrained by the wall(s) of the fuel cell compartment in which fuel cell 100 is located. As fuel 122 is consumed by the aircraft and therefore pumped out of fuel cell 100, fuel cell 100 may gradually fold back into the collapsed state along folding pattern 114 as shown in FIG. 3G.

Figure 6A:
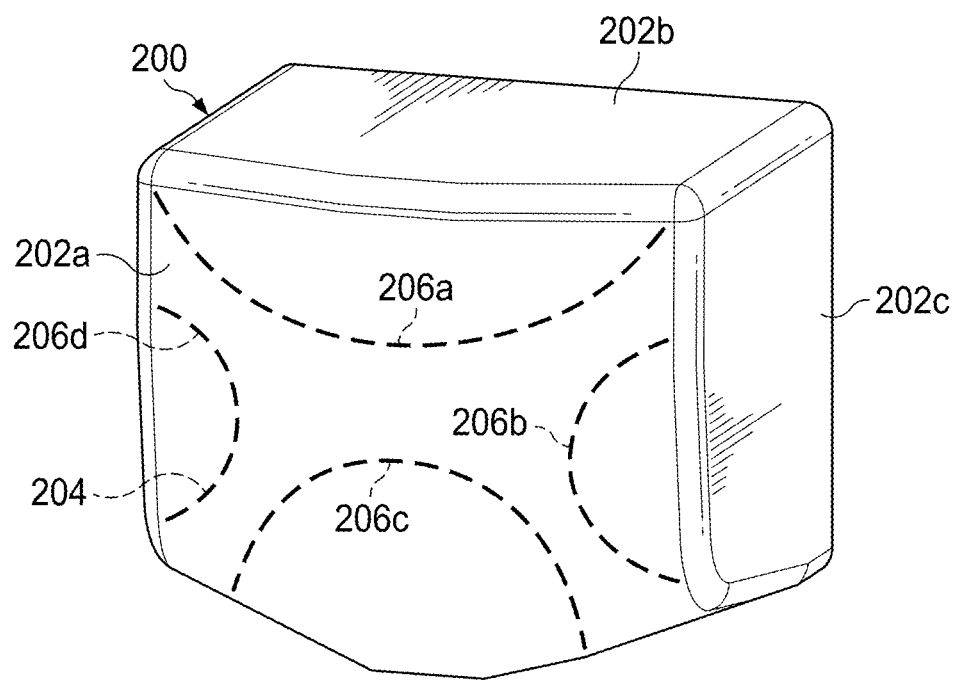
FIGS. 6A-6B are isometric views of collapsible fuel cells having different fold patterns in accordance with embodiments of the present disclosure.
Figure 6B:
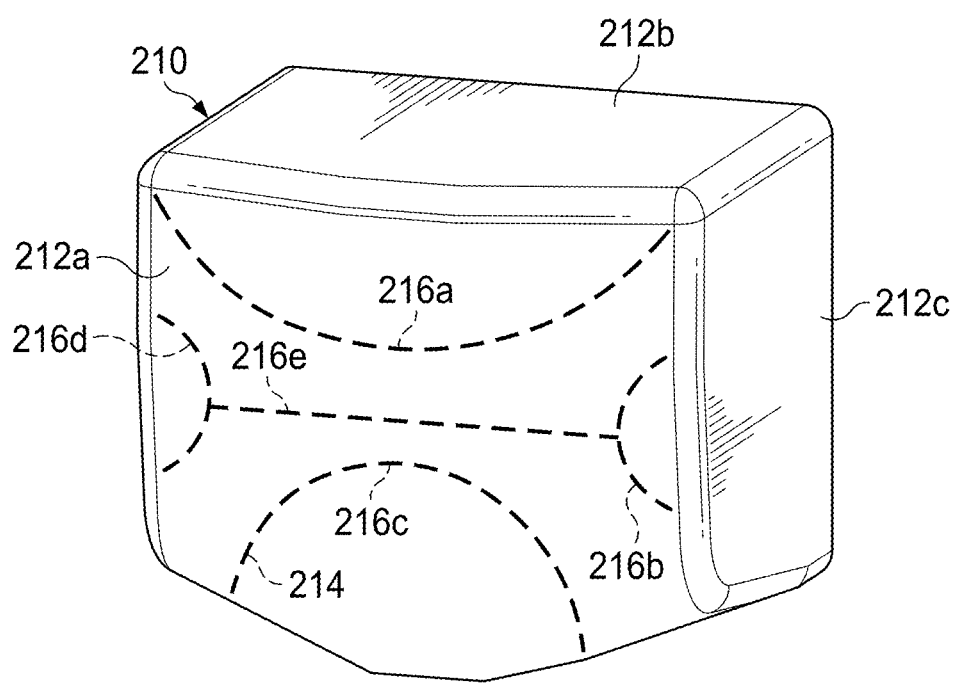

Referring to FIGS. 6A-6B in the drawings, various fuel cells with different folding patterns are depicted. In FIG. 6A, fuel cell 200 includes front wall 202a, top wall 202b, side walls 202c, a bottom wall (not shown) and a rear wall (not shown). The bottom wall of fuel cell 200 is curved such that the bottom sides of front wall 202a and the rear wall are tapered. The fold patterns of the collapsible fuel cells disclosed herein may vary based on certain characteristics of the fuel cell such as the shape of the fuel cell and/or the physical characteristics of the fuel cell compartment in which the fuel cell is installed. Curvilinear crease lines may be particularly suitable for use in fuel cells having curved surfaces, although curvilinear crease lines may be used on fuel cells without curved surfaces as well. In the illustrated embodiment, front wall 202a of fuel cell 200 has a folding pattern 204 that includes four curvilinear crease lines 206a, 206b, 206c, 206d, each having an arc shape. In other embodiments, folding pattern 204 on front wall 202a may include more than or less than four curvilinear crease lines. Curvilinear crease lines 206a, 206b, 206c, 206d are positioned at respective edges of front wall 202a. In some embodiments, the rear wall of fuel cell 200 may include curvilinear crease lines similar to curvilinear crease lines 206a, 206b, 206c, 206d. However, any combination of walls of fuel cell 200 may include crease lines, curvilinear or otherwise, to form a folding pattern. In FIG. 6B, fuel cell 210 includes front wall 212a, top wall 212b, side walls 212c, a bottom wall (not shown) and a rear wall (not shown) having similar dimensions to fuel cell 200. Front wall 212a of fuel cell 210 has a folding pattern 214 that includes four curvilinear crease lines 216a, 216b, 216c, 216d, each having an arc shape, as well as a straight crease line 216e connecting curvilinear crease lines 216b, 216d and interposed between curvilinear crease lines 216a, 216b, 216c, 216d. In other embodiments, folding pattern 214 may additionally or alternatively include a straight crease line connecting curvilinear crease lines 216a, 216c. Folding pattern 214 may be formed from crease lines on any combination of walls of fuel cell 210.

Figure 7A:
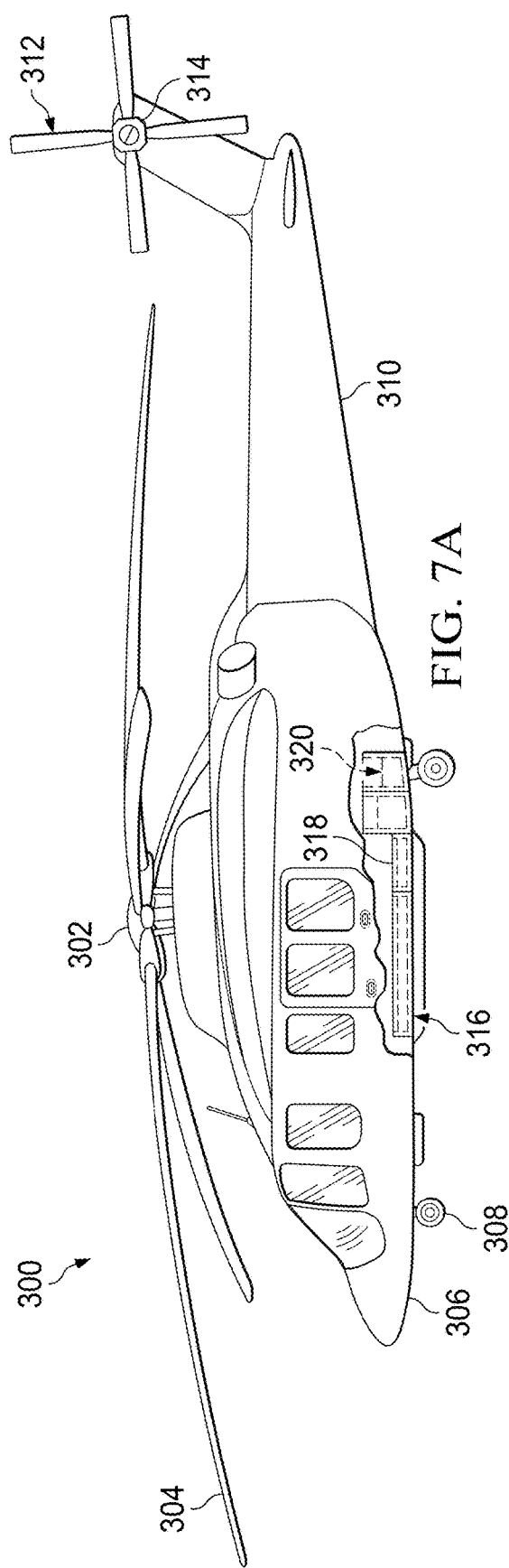
FIGS. 7A-7C are schematic illustrations of a helicopter having collapsible fuel cells in accordance with embodiments of the present disclosure.
Figure 7B:
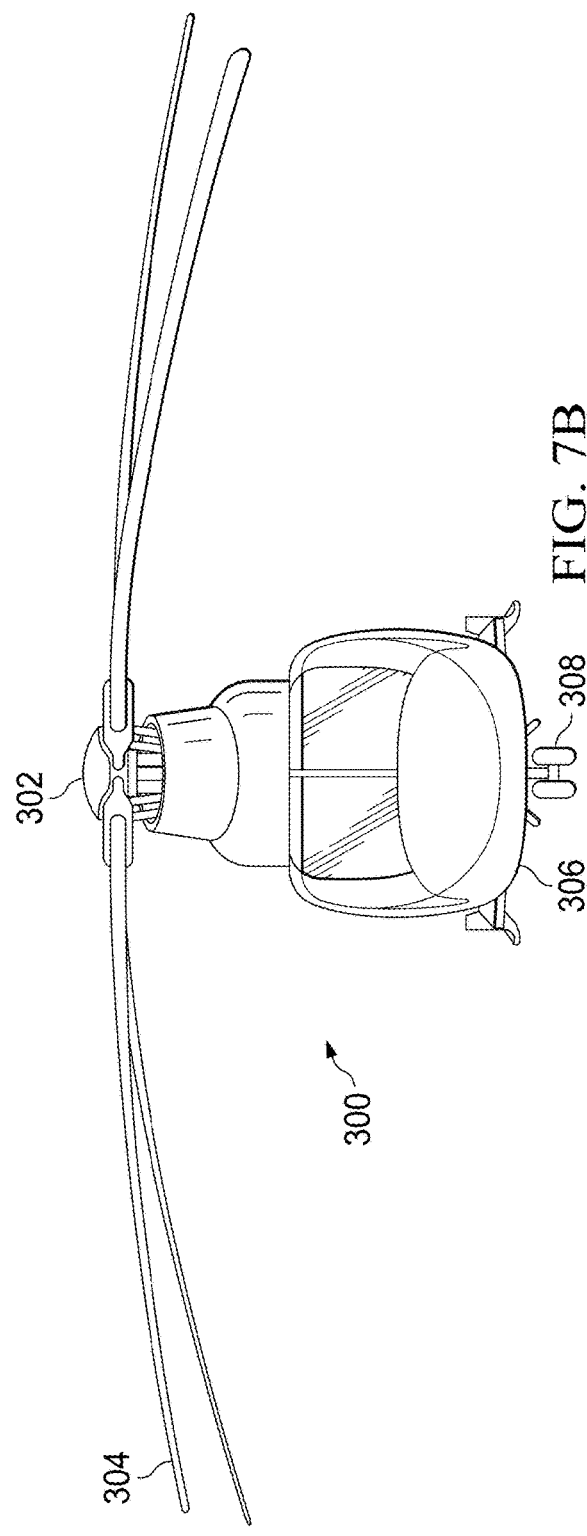
Figure 7C:
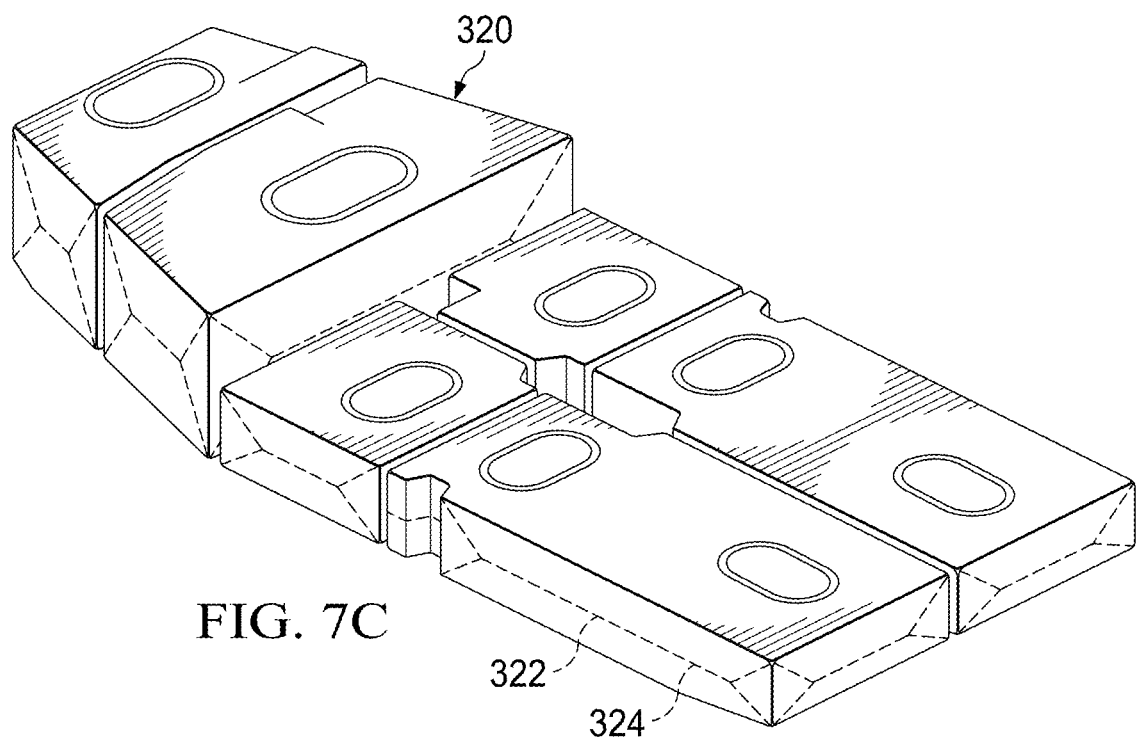

Referring to FIGS. 7A-7C in the drawings, a helicopter is schematically illustrated and generally designated 300. Helicopter 300 has a rotor hub assembly 302, which includes a plurality of rotor blade assemblies 304. Rotor hub assembly 302 is rotatable relative to a fuselage 306 of helicopter 300. The pitch of rotor blade assemblies 304 can be collectively and/or cyclically manipulated to selectively control direction, thrust and lift of helicopter 300. A landing gear system 308 provides ground support for helicopter 300. A tailboom 310 extends from fuselage 306. A tail rotor 312 includes a tail rotor hub assembly 314 that is rotatably coupled to the aft portion of tailboom 310.

Helicopter 300 has a fuel system 316 including a fuselage fuel cell compartment 318 located in a lower portion of fuselage 306. Fuselage fuel cell compartment 318 is coupled to fuselage 306 and may be fully or partially integral with fuselage 306 or may be independent of but secured to fuselage 306. In other aircraft configurations, fuselage fuel cell compartment 318 may be located elsewhere in fuselage 306. Fuselage fuel cell compartment 318 contains collapsible fuel cells 320. The fuel contained in fuel cells 320 is used as an energy source to power the various systems of helicopter 300 such as rotor hub assembly 302 and tail rotor hub assembly 314. Fuel cells 320 may be fluidly coupled to one another to allow for the transfer of fuel and/or gas therebetween. As best seen in FIG. 7C, the lateral walls of each fuel cell 320 include straight and intersecting crease lines 322 that form a folding pattern 324 along which each fuel cell 320 is collapsible. The top and/or bottom walls of each fuel cell 320 may additionally or alternatively include crease lines. Indeed, crease lines 322 may be located on any combination of walls of fuel cells 320. FIGS. 7A-7C illustrate another non-limiting example of the wide range of locations, aircraft and configurations in which the collapsible fuel cells of the illustrative embodiments may be utilized.

Figure 8A:
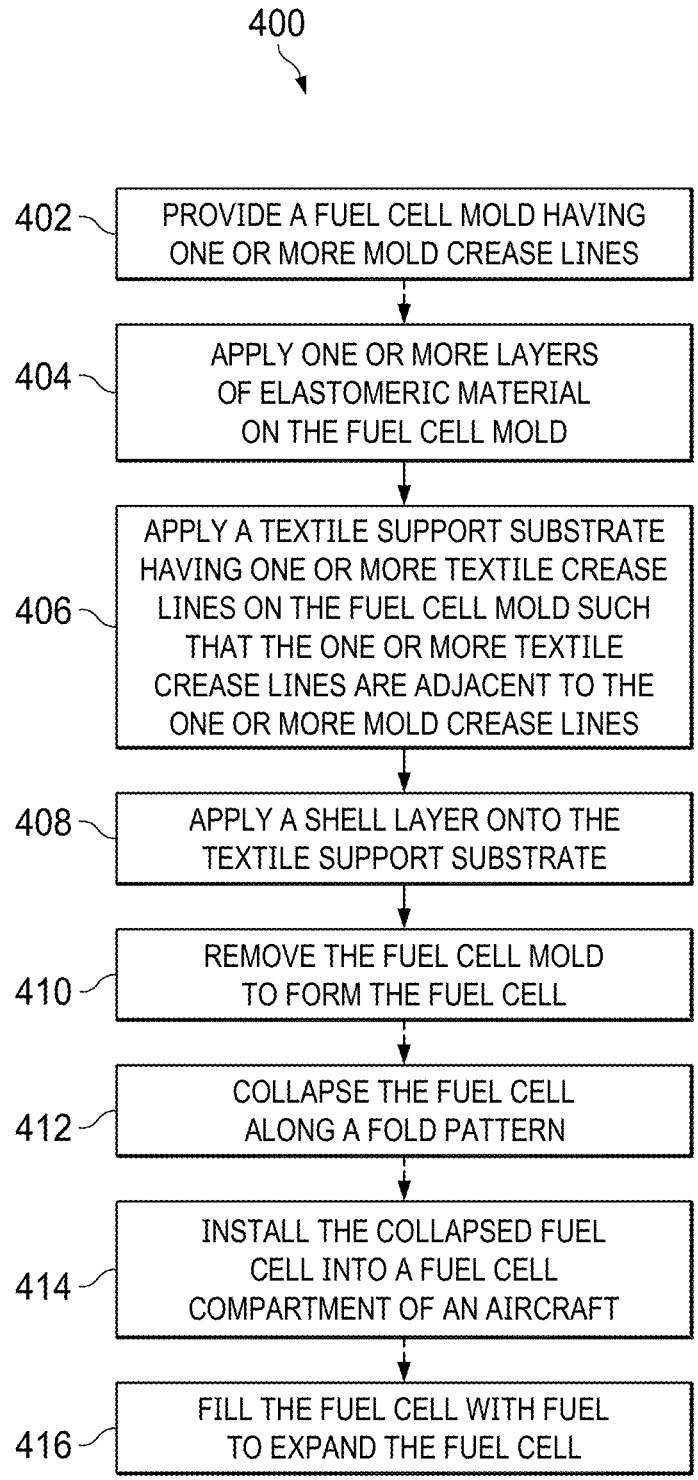
FIGS. 8A-8C are flowcharts of various methods for manufacturing a collapsible fuel cell in accordance with embodiments of the present disclosure.
Figures 8B, 8C:
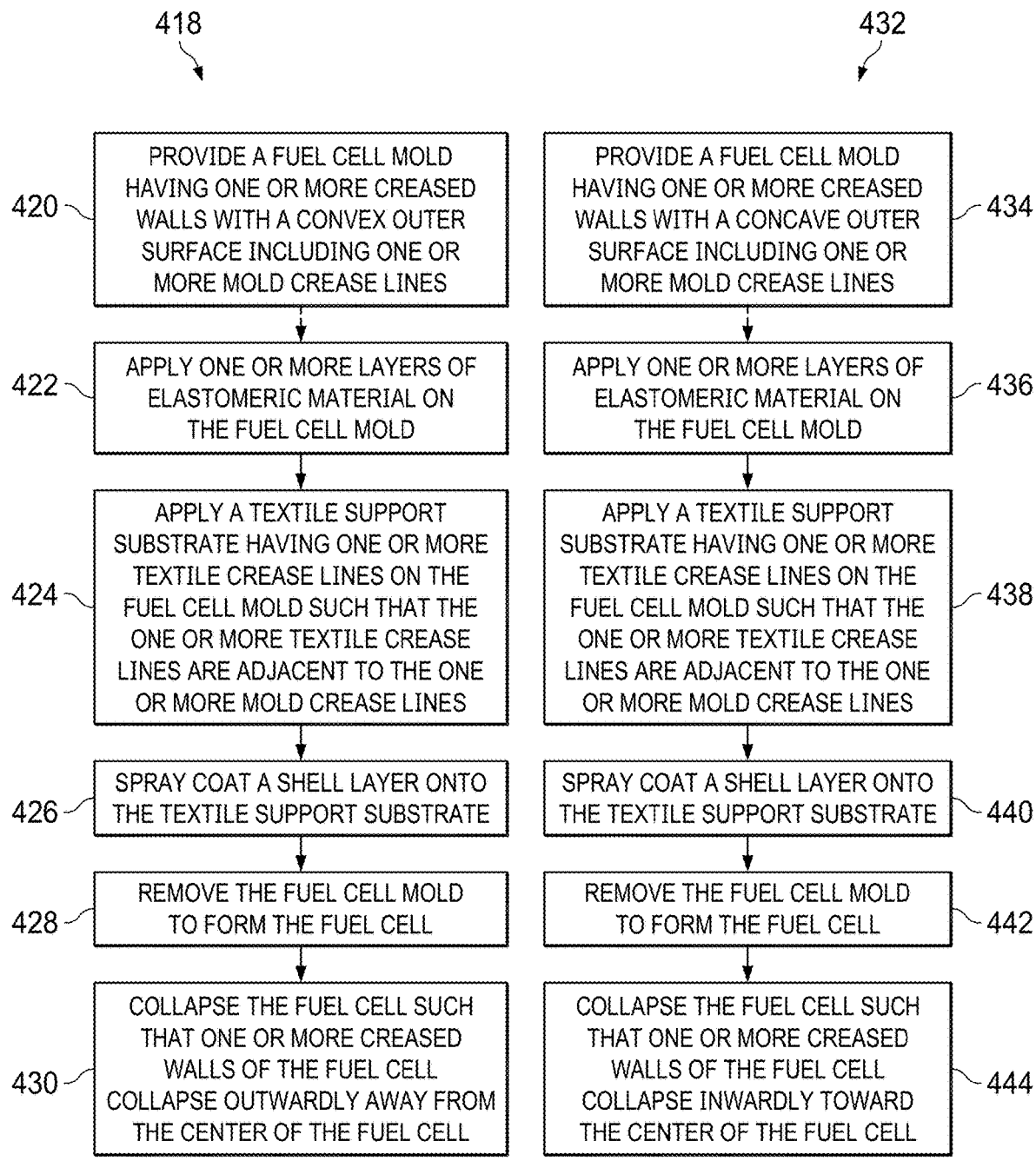

Referring to FIGS. 8A-8C in the drawings, various methods for manufacturing collapsible fuels for aircraft are depicted. In FIG. 8A, method 400 includes providing a fuel cell mold having one or more mold crease lines (step 402). Optionally, method 400 may include applying one or more layers of elastomeric material on the fuel cell mold (step 404). Method 400 also includes applying a textile support substrate such as a prefitted knitted fabric having one or more textile crease lines on the fuel cell mold such that the one or more textile crease lines are adjacent to the one or more mold crease lines (step 406). In embodiments in which one or more layers of elastomeric material are applied on the fuel cell mold as in optional step 404, applying the textile support substrate on the fuel cell mold includes applying the textile support substrate on the one or more layers of elastomeric material. In some embodiments, providing the fuel cell mold may include 3D printing the fuel cell mold. Method 400 also includes applying a shell layer onto the textile support substrate (step 408) and removing the fuel cell mold to form the fuel cell (step 410). In an installation portion of the manufacturing process, method 400 may include collapsing the fuel cell along a fold pattern formed by the crease lines (step 412), installing the collapsed fuel cell into a fuel cell compartment of an aircraft (step 414) and filling the fuel cell with fuel to expand the fuel cell (step 416).

In FIG. 8B, method 418 includes providing a fuel cell mold having one or more creased walls with a convex outer surface including one or more mold crease lines (step 420). Optionally, method 418 may include applying one or more layers of elastomeric material on the fuel cell mold (step 422). Method 418 also includes applying a textile support substrate having one or more textile crease lines on the fuel cell mold such that the one or more textile crease lines are adjacent to the one or more mold crease lines (step 424). In embodiments in which one or more layers of elastomeric material are applied on the fuel cell mold as in optional step 422, applying the textile support substrate on the fuel cell mold includes applying the textile support substrate on the one or more layers of elastomeric material. Method 418 also includes spray coating a shell layer onto the textile support substrate (step 426), removing the fuel cell mold to form the fuel cell (step 428) and collapsing the fuel cell such that one or more creased walls of the fuel cell collapse outwardly away from the center of the fuel cell (step 430). In FIG. 8C, method 432 includes providing a fuel cell mold having one or more creased walls with a concave outer surface including one or more mold crease lines (step 434). Optionally, method 432 may include applying one or more layers of elastomeric material on the fuel cell mold (step 436). Method 432 also includes applying a textile support substrate having one or more textile crease lines on the fuel cell mold such that the one or more textile crease lines are adjacent to the one or more mold crease lines (step 438). In embodiments in which one or more layers of elastomeric material are applied on the fuel cell mold as in optional step 436, applying the textile support substrate on the fuel cell mold includes applying the textile support substrate on the one or more layers of elastomeric material. Method 432 also includes spray coating a shell layer onto the textile support substrate (step 440), removing the fuel cell mold to form the fuel cell (step 442) and collapsing the fuel cell such that one or more creased walls of the fuel cell collapse inwardly toward the center of the fuel cell (step 444).

Referring to FIGS. 9A-9D in the drawings, a wing of a tiltrotor aircraft such as tiltrotor aircraft 10 in FIGS. 1A-1B is schematically illustrated and generally designated 500. Wing 500 is supported by wing airframe 502, which includes wing skin and internal support structure such as ribs 504 and spars 506. Wing airframe 502 forms a fuel cell compartment 508 in which a fuel cell such as a wing auxiliary tank may be installed. Service connections to fittings on previous fuel cells may be difficult to access due to the tight clearance between the fuel cell and the bounding ribs 504 or spars 506 of fuel cell compartment 508. To address this issue, fuel cell 510 includes extensible fitting regions 512, 514, which increase the flexibility of tight radius fuel cell fittings such as fittings 516, 518 by adding an area of increased extensibility, or flexibility, around such fittings. Fittings 516, 518 are used to connect fuel cell 510 to fuel hoses 520 for the movement of fuel through the aircraft, although extensible fitting regions 512, 514 may be used for any type of fitting used to connect fuel cell 510 to other components of the aircraft. Extensible fitting regions need not be used for all fittings of fuel cell 510, although any combination of fitting sites may include an extensible fitting region. For example, an extensible fitting region may be added to the location of a hard-to-install or last-to-install fitting of fuel cell 510. Extensible fitting regions 512, 514 may be used in combination with the collapsible fuel cells disclosed herein, in which case fuel cell 510 may be both collapsible and include extensible fitting regions 512, 514. In one non-limiting example, the use of extensible fitting regions may be particularly suitable for fuel cells that require large rigid and/or metallic fittings or connectors.

Fuel cell 510 includes an inner textile support substrate 522 having an outer surface 524. In some embodiments, the thickness of textile support substrate 522 at extensible fitting regions 512, 514 may be less than the thickness of nonextensible regions of textile support substrate 522 to increase the flexibility of textile support substrate 522 at extensible fitting regions 512, 514. Fuel cell 510 also includes an outer shell layer 526 conforming to outer surface 524 of textile support substrate 522. Shell layer 526 may be an elastomeric material that is flexible at extensible fitting regions 512, 514. Extensible fitting regions 512, 514 have a sinusoidal or accordion-like neck profile that increases the surface area of fuel cell 510 around fittings 516, 518. The extensibility of extensible fitting regions 512, 514 allows fittings 516, 518 to be recessed within fuel cell 510 during installation and/or during operation. Extensible fitting regions 512, 514 may be uniquely engineered for a particular fuel cell, fuel cell compartment or aircraft for ease of fit and installation within the fuel cell compartment. In some embodiments, extensible fitting regions 512, 514 may be utilized on prequalified fuel cells to avoid the time and cost of requalification. Advantageously, extensible fitting regions 512, 514 do not compromise fuel capacity and add little or no weight to fuel cell 510. Fuel cell 510 is easier to maintain since extensible fitting regions 512, 514 reduce the difficulty of servicing connections to fuel cell 510. Extensible fitting regions 512, 514 may also reduce the difficulty by which components and fittings such as fuel pump 528, sump plate 530 and/or fittings 516, 518 are attached to fuel cell 510. Extensible fitting regions 512, 514 thus reduce installation and servicing cycles, thereby improving fleet readiness levels. Extensible fitting regions 512, 514 may be produced in conjunction with a wide range of manufacturing processes that may be used to enhance the installability, serviceability, flexibility, collapsibility, crashworthiness and/or ballistic tolerance of fuel cell 510. While fuel cell 510 is shown as a wing auxiliary tank disposed in wing 500, fuel cell 510 including extensible fitting regions 512, 514 may be located on any portion of an aircraft for which fuel storage is feasible such as the fuselage.

It should be appreciated that a tiltrotor aircraft is merely illustrative of a variety of aircraft that can implement the embodiments disclosed herein. Indeed, fuel cell 510 including extensible fitting regions 512, 514 may be implemented on any aircraft that requires fuel. Other aircraft implementations can include helicopters, hybrid aircraft, tiltwing aircraft, quad tiltrotor aircraft, unmanned aircraft, gyrocopters, propeller-driven airplanes, compound helicopters, jets, drones and the like. As such, those skilled in the art will recognize that fuel cell 510 including extensible fitting regions 512, 514 can be integrated into a variety of aircraft configurations. It should be appreciated that even though aircraft are particularly well-suited to implement the embodiments of the present disclosure, non-aircraft vehicles and devices such as land or water vehicles can also implement the embodiments.

Figure 10A:
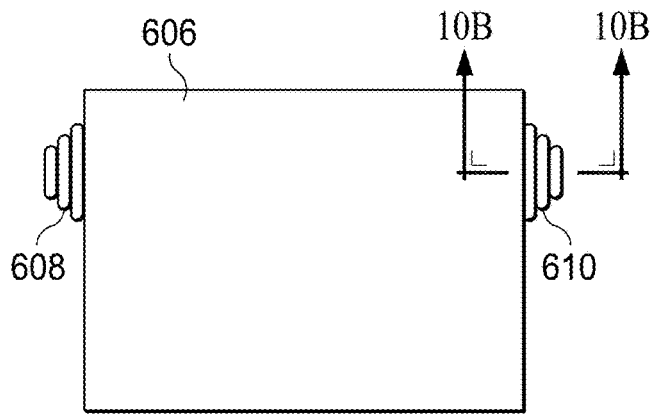
FIGS. 10A-10I are various views of a fuel cell having extensible fitting regions being produced in a sequential manufacturing process in accordance with embodiments of the present disclosure.
Figure 10B:
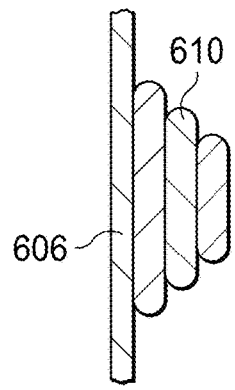

Referring to FIGS. 10A-10I in the drawings, a manufacturing process for the production of fuel cell 600 with extensible fitting regions 602, 604 is depicted. While the manufacturing process is shown to have a particular sequence of steps, it will be appreciated that the steps shown therein may occur out of the illustrated or described order depending on the embodiment and/or application. In other embodiments, one or more illustrated or described steps may be omitted. For ease of reference, fuel cell 600 is shown to have a test cube shape similar to fuel cell 38 in FIGS. 2A-2E, although fuel cell 600 may be manufactured to form a wide variety of shapes. As shown in FIGS. 10A-10B, the manufacturing process begins with a fuel cell mold 606 having extensible fitting protrusions 608, 610. Although extensible fitting protrusions 608, 610 are shown to protrude away from the center of fuel cell mold 606, in other embodiments extensible fitting protrusions 608, 610 may protrude inward toward the center of fuel cell mold 606. Extensible fitting protrusions 608, 610 are engineered surface areas located at predesigned locations of fuel cell mold 606, for example in locations where one or more fittings 612, 614 are to be attached to fuel cell 600.

Fuel cell mold 606 acts as an inner mold atop which fuel cell 600 may be layered, after which fuel cell mold 606 is removed or destroyed. Thus, fuel cell mold 606 is not part of the finished fuel cell 600 that is installed in the aircraft. Once the locations, dimensions and configuration of extensible fitting regions 602, 604 for fuel cell 600 have been determined, designed or engineered, extensible fitting protrusions 608, 610 are incorporated into the design of fuel cell mold 606. Extensible fitting protrusions 608, 610 have a tiered, stair-step type profile upon which to build extensible fitting regions 602, 604, although extensible fitting protrusions 608, 610 may have a variety of different shapes. The inward, outward or other shape formed by extensible fitting protrusions 608, 610 of fuel cell mold 606 provide an increased surface area that facilitates the flexibility of extensible fitting regions 602, 604.

Fuel cell mold 606 may be manufactured using a wide variety of additive, subtractive or formative manufacturing techniques including, but not limited to, extrusion, machining, 3D printing, stamping, welding or casting as well as others. In the illustrated embodiment fuel cell mold 606 is 3D printed by a 3D printer. Fuel cell mold 606 may be 3D printed using PLA, ABS, Nylon or a wide variety of other 3D printable materials using a range of different 3D printing technologies such as FDM or SLA. In some embodiments, a plurality of fuel cell mold segments may be 3D printed and subsequently assembled to form fuel cell mold 606. For example, fuel cell mold 606 may be 3D printed as two cupped halves joined together to form fuel cell mold 606, thereby avoiding the need for struts or other internal supports. In another example, extensible fitting protrusions 608, 610 may be 3D printed separately from the remainder of fuel cell mold 606 and attached thereto.

Figure 10C:
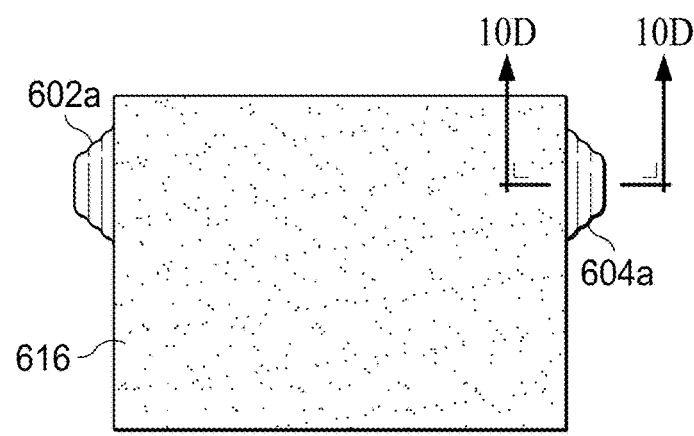
Figure 10D:
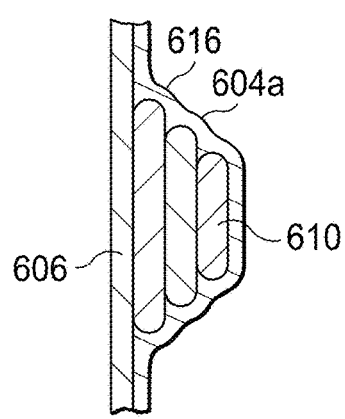

Referring to FIGS. 10C-10D, after fuel cell mold 606 has been 3D printed or otherwise provided, a textile support substrate 616 having textile extensible fitting regions 602a, 604a is applied onto the outer surface of fuel cell mold 606 such that textile extensible fitting regions 602a, 604a cover extensible fitting protrusions 608, 610. In some embodiments, an adhesive may be applied between fuel cell mold 606 and textile support substrate 616 so that textile support substrate 616 better conforms to the shape of fuel cell mold 606 including extensible fitting protrusions 608, 610. In certain embodiments, one or more layers, or coatings, of elastomeric material may be applied on fuel cell mold 606 before textile support substrate 616 is applied such that the one or more layers of elastomeric material are interposed between fuel cell mold 606 and textile support substrate 616. In such embodiments, adhesive may be applied between fuel cell mold 606 and the one or more layers of elastomeric material so that the one or more layers of elastomeric material better conform to fuel cell mold 606.

In some embodiments, textile support substrate 616 may be a knitted, or woven, fabric formed of composite material (s) that is prefitted to cover fuel cell mold 606. In certain embodiments, textile support substrate 616 may be knitted as a single piece that is near net shape off of the knitting machine including textile extensible fitting regions 602a, 604a and subsequently stretched and placed over fuel cell mold 606. In some embodiments, textile support substrate 616 may be formed from composite materials that may include numerous material plies composed of natural or synthetic and continuous or chopped filaments or fibers including one or more of glass, fiberglass, Kevlar, quartz, polyester, ceramics, polypropylene, carbon, graphite, basalt, aromatic polyamide materials or the like or any combination thereof. The material plies which form textile support substrate 616 may be in the form of braids, fibers, threads or strands or fabrics such as veil mats, short fiber mats, multiaxial cloth such as biaxial or triaxial cloth, woven fabrics, tape such as unidirectional tape and the like. Plies or individually-placed fibers may be joined together with a resin such as a polymeric matrix including thermoplastic or thermosetting resins or any suitable resin system such as epoxies, polyimides, polyamides, bismaleimides, polyesters, vinyl esters, polyurethane, phenolics, polyetheretherketones (PEEK), polyetherketones (PEK), polyphenylene sulfides (PPS) and the like. The resins may originate as a liquid and polymerize during the cure process and harden. Fabric that is preimpregnated with resin, or prepreg, may also be used to manufacture textile support substrate 616. The weight ratio of fibers to resin can range from 20% fibers and 80% resin to 70% fibers and 30% resin, although other ratios are within the scope of the illustrative embodiments. Higher and/or continuous fiber content can provide enhanced strength and stiffness. Fibers, whether individually placed or in sheet form, can be orientated in any direction such as 0, 45 or 90 degrees relative to a reference axis, as in some braided plies, to provide desired strength characteristics such as torsional stiffness. For example, braided off-axis fibers may be integrated to reinforce strength in an off-axis direction. The use of composite materials provides the ability to tailor the combination of fibers and resin to meet design requirements of fuel cell 600 such as stiffness or flexibility.

Textile support substrate 616 has a geometry that enables a broadcloth, or broad goods, construction process such as a single layup and single cure. In other embodiments, textile support substrate 616 may be formed using a broadcloth and/or layered tape construction process having a manual or automated layup of a plurality of composite broad goods material layers such as fiberglass fabric, carbon fabric, fiberglass tape, carbon tape and combinations thereof positioned over fuel cell mold 606, thus forming a laminate stack. In one non-limiting example, the composite material of textile support substrate 616 may be wound or braided on a rotisserie to cover fuel cell mold 606. The structure of fuel cell 600 allows for an entirely automated broad goods layup or the combination of an automated and a manual broad goods layup. Even though particular methods of manufacture and composites have been described herein, it should be understood by those having ordinary skill in the art that other methods of manufacture and composites could alternatively or additionally be used to produce or apply textile support substrate 616.

In one example, textile support substrate 616 may be formed using a layup process wherein a plurality of plies, which may be preimpregnated with an uncured resin, are placed on fuel cell mold 606. The plies may have the same or different shapes, may be the same or different materials, may have the same or different fabric weaves, may have the same or different thicknesses, may be continuous or discontinuous, may extend beyond the periphery of fuel cell mold 606 or be fully within the periphery of fuel cell mold 606, may be oriented in the same or different directions and/or may have other similarities or differences. In one embodiment, the plies may be an intermediate modulus epoxy resin impregnated carbon fiber fabric that is stiffer than conventional composite fabrics, thereby allowing for fewer plies and reducing the weight and manufacturing cost. Each fabric layer is considered a ply of the laminate with the total number of plies ranging from between a single ply to 100 or more plies. Any number of composite layers or plies may be used to form textile support substrate 616. In some embodiments, each ply of textile support substrate 616 may have ends that are butt-spliced to one another to form a closed loop. In yet other embodiments, the composite layers of textile support substrate 616 may be applied using a spray layup process with overlapped splices.

Following layup of the plies of textile support substrate 616, in some embodiments the plies may be compacted, or debulked, to remove any pockets of air and to provide adequate attachment therebetween. The compacting step can be achieved by applying a vacuum to the plies in the mold, by pressurization or by pressing a second mold member or roller on the plies. Compacting not only consolidates the layup but also removes air trapped in the resin matrix that would otherwise create undesirable voids (air pockets) in the laminate that could weaken textile support substrate 616. After the plies are compacted, the plies of textile support substrate 616 may be cured to form a laminate by heating and/or pressurizing the plies. In the curing process, textile support substrate 616 may be inserted into an autoclave, which is a pressure chamber used to carry out industrial and scientific processes requiring elevated temperature and pressure in relation to ambient temperature and pressure. Following the curing process, the laminate may be trimmed or otherwise machined as desired. After curing, the composite material layers form a high strength, lightweight composite textile support substrate 616.

In some embodiments, the fabric density at textile extensible fitting regions 602*a*, 604*a* is less than the fabric density at the remainder of textile support substrate 616, thereby facilitating the flexibility of fuel cell 600 at extensible fitting regions 602, 604. In other embodiments, textile extensible fitting regions 602*a*, 604*a* are thinner than the remainder of textile support substrate 616, which facilitates the flexibility of fuel cell 600 at extensible fitting regions 602, 604. In one non-limiting example, textile extensible fitting regions 602*a*, 604*a* may be in a range between 25 percent and 33 percent thinner than the remainder of textile support substrate 616. In other embodiments, the fabric structure or material composition of textile extensible fitting regions 602*a*, 604*a* may differ from the fabric structure or material composition of the remainder of textile support substrate 616 to facilitate the flexibility of fuel cell 600 at extensible fitting regions 602, 604. In yet other embodiments, the fabric density, thickness, fabric structure and material composition of textile extensible fitting regions 602*a*, 604*a* may be the same as the fabric density, thickness, fabric structure and material composition of the remainder of textile support substrate 616, and textile extensible fitting regions 602*a*, 604*a* may be formed by contact between textile support substrate 616 and fuel cell mold 606.

Figure 10E:
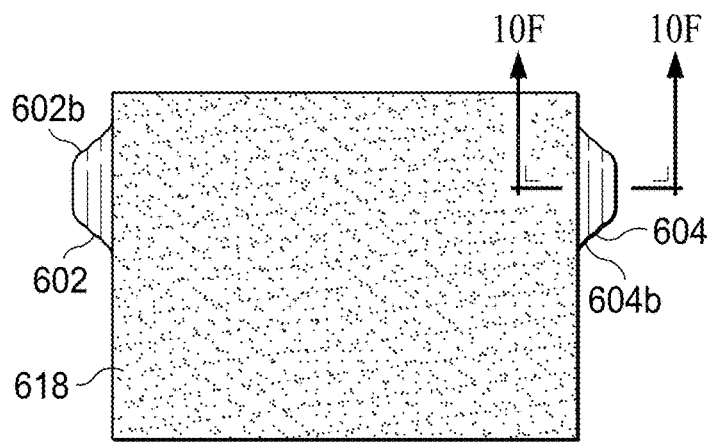
Figure 10F:
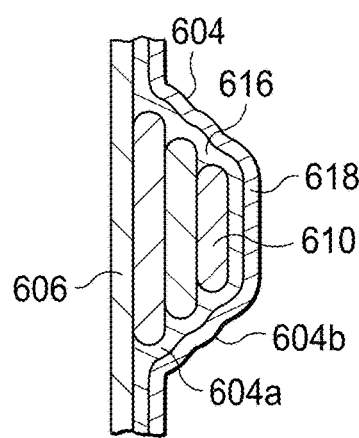

Referring to FIGS. 10E-10F, an outer shell layer 618 is applied on textile support substrate 616 in the illustrative manufacturing process. Shell layer 618 is formed from an elastomeric material with sufficient elasticity to enable extensible fitting regions 602, 604 to flex without forming cracks or other structural discontinuities therein. Shell layer 618 may be spray coated on textile support substrate 616. Shell layer 618 may be robotically spray coated on textile support substrate 616 by a spray coating machine, although in other embodiments shell layer 618 may be manually applied on textile support substrate 616. In some embodiments, shell layer 618 may be applied so as to have a uniform thickness and material composition over the entirety of textile support substrate 616 including over textile extensible fitting regions 602*a*, 604*a*.

In other embodiments, shell layer 618 may include shell extensible fitting regions 602*b*, 604*b*. The material composition and/or the thickness of the elastomeric material at shell extensible fitting regions 602*b*, 604*b* may be varied as compared to the remainder of shell layer 618 to customize the flexibility of extensible fitting regions 602, 604. Shell extensible fitting regions 602*b*, 604*b* cover textile extensible fitting regions 602*a*, 604*a*. In embodiments in which the chemical composition of shell extensible fitting regions 602*b*, 604*b* differs from the chemical composition of the remainder of shell layer 618, the chemical compositions at both shell extensible fitting regions 602*b*, 604*b* and the remainder of shell layer 618 may be varied to increase or decrease the rigidity of shell layer 618 for different levels of flexibility of shell layer 618 at extensible fitting regions 602, 604 or overall. In such embodiments, more flexible chemical compositions may be sprayed at shell extensible fitting regions 602*b*, 604*b* and more rigid chemical compositions may be sprayed at the remainder of shell layer 618. For example, the chemical composition of shell extensible fitting regions 602*b*, 604*b* may break at 600-800 percent elongation and the chemical composition of the remainder of shell layer 618 may be stiffer and break at 250-400 percent elongation while still maintaining the same toughness for all areas to enhance fuel cell survivability. In embodiments in which shell layer 618 is thinner at shell extensible fitting regions 602b, 604b than at the remainder of shell layer 618, a uniform chemical composition may be sprayed on textile support substrate 616 but less may be used at shell extensible fitting regions 602b, 604b. In other examples, both the chemical composition and amount of material at shell extensible fitting regions 602b, 604b may be different from the chemical composition and amount of material applied at the remainder of shell layer 618. The manufacturing step of applying shell layer 618 allows for the synergistic use of flexible, high strength to performance ratio raw materials, and such materials may be increased, decreased and/or substituted via a precise robotically or nonrobotically controlled application. In other embodiments, additional layers may be applied to fuel cell 600 on top of shell layer 618 so that shell layer 618 is no longer the outermost layer of fuel cell 600. Such additional layers or shell layer 618 itself may include performance enhancing layers such as fuel barrier layers, self-sealing layers and/or ballistic protection layers. Performance enhancing layers may also be interposed between textile support substrate 616 and shell layer 618. In yet other embodiments, fuel cell 600 may be formed without textile support substrate 616, in which case one or more layers of elastomeric material and/or shell layer 618 may be applied on fuel cell mold 606 without textile support substrate 616. Performance characteristics of extensible fitting regions 602, 604 may be engineered to meet survivability specifications such as ballistic protection and/or crashworthiness specifications. In some embodiments, extensible fitting regions 602, 604 may have lower ballistic protection requirements, thereby allowing more freedom in the selection of chemical compositions to be used at extensible fitting regions 602, 604.

Figure 10G:
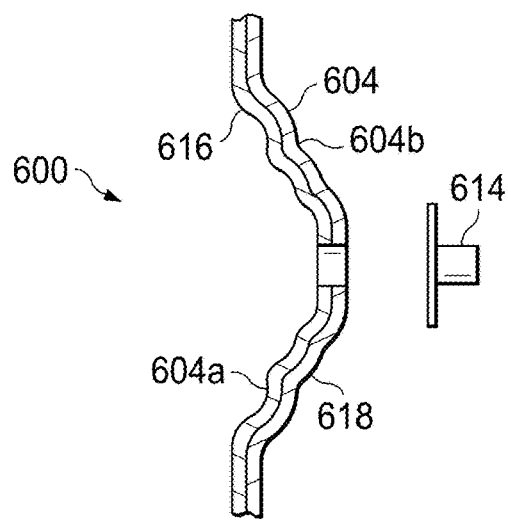
Figure 10H:
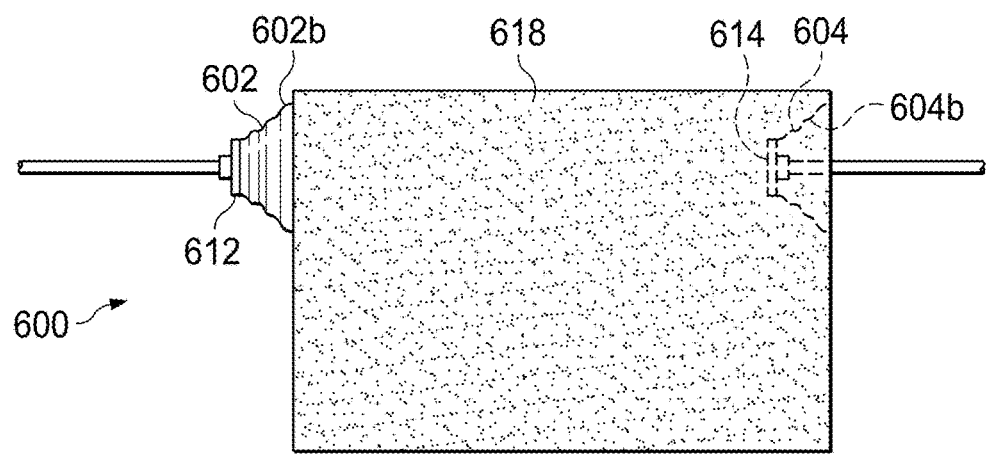
Figure 10I:
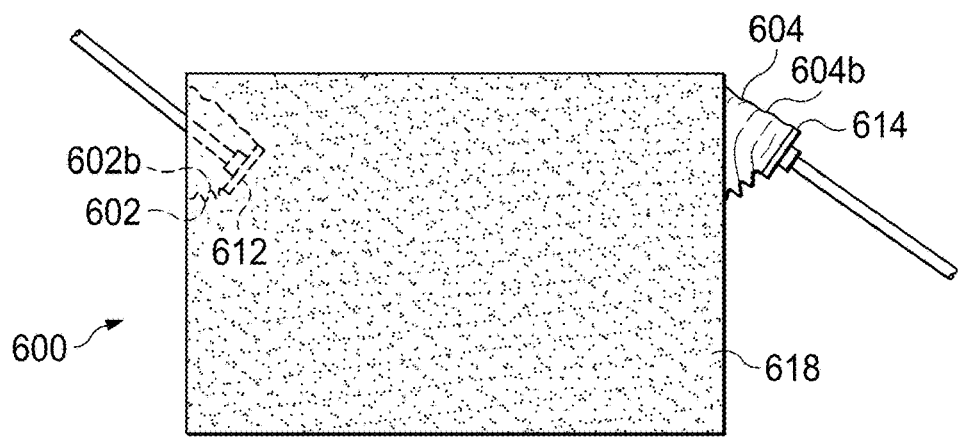

In FIGS. 10G-10I, fuel cell mold 606 has been removed in the manufacturing process to form fuel cell 600. In removing fuel cell mold 606 from inside of textile support substrate 616 and shell layer 618, fuel cell mold 606 may be dismantled for future or repeat use or destructively removed for a one-time use of fuel cell mold 606. For example, in embodiments in which fuel cell mold 606 is formed from 3D printed fuel cell mold segments, fuel cell mold 606 may be removed from inside of textile support substrate 616 and shell layer 618 one segment at a time. Upon removal of fuel cell mold 606, extensible fitting regions 602, 604 have built-in flexibility and may be machined or further modified so that fittings 612, 614 may be attached thereto. FIG. 10H shows fittings 612, 614 attached to extensible fitting regions 602, 604, with extensible fitting region 602 extended from the body of fuel cell 600 and extensible fitting region 604 recessed into fuel cell 600. As shown in FIG. 10I, extensible fitting regions 602, 604 may also wobble or flex in a side-to-side motion while either extended or recessed, further facilitating the connection of fittings 612, 614 to other components of the aircraft. In certain embodiments, extensible fitting regions 602, 604 may wobble or flex in a 360 degree motion. Extensible fitting regions 602, 604 thus help to facilitate fitting connection installation and servicing in a wide variety of fuel cell compartment sizes and configurations. After fuel cell 600 has been installed into a fuel cell compartment of the aircraft, fuel cell 600 may be filled with fuel.

Figure 11:
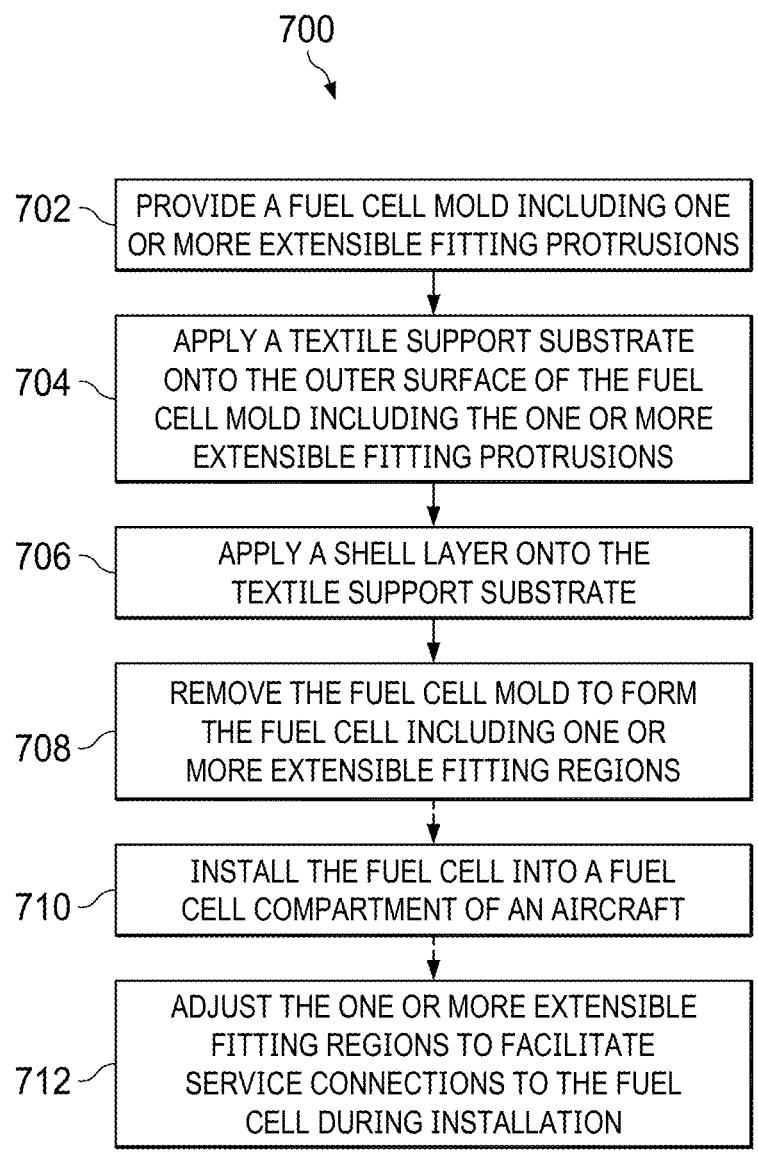
FIG. 11 is a flowchart of a method for manufacturing a fuel cell having one or more extensible fitting regions in accordance with embodiments of the present disclosure.

Referring to FIG. 11 in the drawings, a method 700 for manufacturing a fuel cell having extensible fitting regions is depicted. Method 700 includes providing a fuel cell mold including one or more extensible fitting protrusions (step 702), applying a textile support substrate onto the outer surface of the fuel cell mold including the one or more extensible fitting protrusions (step 704) and applying a shell layer onto the textile support substrate (step 706). In some embodiments, one or more layers of elastomeric material may be applied on the fuel cell mold before the textile support substrate is applied thereon. Method 700 also includes removing the fuel cell mold to form the fuel cell including one or more extensible fitting regions (step 708). Optionally, method 700 includes installing the fuel cell into a fuel cell compartment of an aircraft (step 710) and adjusting the one or more extensible fitting regions to facilitate service connections to the fuel cell during installation (step 712). In other embodiments, resin-infused extensible fitting regions may be attached to standard, nonextensible, collapsible or noncollapsible fuel cells so that qualified or preexisting fuel cells may benefit from having the extensible fitting regions described herein.

The flowcharts in the different depicted embodiments illustrate the architecture, functionality and operation of some possible implementations of apparatus, methods and/or computer program products. In this regard, each block in the flowchart may represent a module, segment or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A collapsible fuel cell for an aircraft, the fuel cell comprising:
    an inner textile support substrate having an outer surface including one or more textile crease lines forming a fold pattern; and
    an outer shell layer conforming to the outer surface of the textile support substrate to form the fuel cell, the fuel cell collapsible along the fold pattern formed by the one or more textile crease lines;

wherein, the textile support substrate has a first thickness at the one or more textile crease lines and a second thickness at uncreased regions of the textile support substrate, the second thickness greater than the first thickness.

2. The fuel cell as recited in claim 1 wherein, the textile support substrate has a first fabric density at the one or more textile crease lines and a second fabric density at uncreased regions of the textile support substrate, the second fabric density greater than the first fabric density.

3. The fuel cell as recited in claim 1 wherein, the one or more textile crease lines comprise intersecting straight lines.

4. The fuel cell as recited in claim 1 wherein, the one or more textile crease lines comprise one or more curvilinear lines.

5. The fuel cell as recited in claim 1 wherein, the shell layer includes one or more shell crease lines adjacent to the one or more textile crease lines to reinforce the fold pattern.

6. The fuel cell as recited in claim 5 wherein, the shell layer comprises a first chemical composition at the one or more shell crease lines and a second chemical composition at uncreased regions of the shell layer, the first chemical composition different from the second chemical composition.

7. The fuel cell as recited in claim 5 wherein, the shell layer has a first thickness at the one or more shell crease lines and a second thickness at uncreased regions of the shell layer, the second thickness greater than the first thickness.

8. The fuel cell as recited in claim 1 wherein, the fuel cell comprises one or more walls having the fold pattern, the one or more walls inwardly collapsible toward the center of the fuel cell.

9. The fuel cell as recited in claim 1 wherein, the fuel cell comprises one or more walls having the fold pattern, the one or more walls outwardly collapsible away from the center of the fuel cell.

10. The fuel cell as recited in claim 1 further comprising:
one or more layers of elastomeric material on an inner surface of the textile support substrate;
wherein, the textile support substrate comprises a knitted fabric;
wherein, the shell layer comprises an elastomeric material; and
wherein, the fuel cell is biased toward a collapsed state when empty of fuel.

11. A collapsible fuel cell for an aircraft, the fuel cell comprising:
an inner textile support substrate having an outer surface including one or more textile crease lines forming a fold pattern; and
an outer shell layer conforming to the outer surface of the textile support substrate to form the fuel cell, the fuel cell collapsible along the fold pattern formed by the one or more textile crease lines;
wherein, the textile support substrate has a first fabric density at the one or more textile crease lines and a second fabric density at uncreased regions of the textile support substrate, the second fabric density greater than the first fabric density.

12. The fuel cell as recited in claim 11 wherein, the one or more textile crease lines comprise intersecting straight lines.

13. The fuel cell as recited in claim 11 wherein, the one or more textile crease lines comprise one or more curvilinear lines.

14. The fuel cell as recited in claim 11 wherein, the shell layer includes one or more shell crease lines adjacent to the one or more textile crease lines to reinforce the fold pattern.

15. The fuel cell as recited in claim 14 wherein, the shell layer comprises a first chemical composition at the one or more shell crease lines and a second chemical composition at uncreased regions of the shell layer, the first chemical composition different from the second chemical composition.

16. The fuel cell as recited in claim 14 wherein, the shell layer has a first thickness at the one or more shell crease lines and a second thickness at uncreased regions of the shell layer, the second thickness greater than the first thickness.

17. The fuel cell as recited in claim 11 wherein, the fuel cell comprises one or more walls having the fold pattern, the one or more walls inwardly collapsible toward the center of the fuel cell.

18. The fuel cell as recited in claim 11 wherein, the fuel cell comprises one or more walls having the fold pattern, the one or more walls outwardly collapsible away from the center of the fuel cell.

19. The fuel cell as recited in claim 11 further comprising:
one or more layers of elastomeric material on an inner surface of the textile support substrate;
wherein, the textile support substrate comprises a knitted fabric;
wherein, the shell layer comprises an elastomeric material; and
wherein, the fuel cell is biased toward a collapsed state when empty of fuel.

20. An aircraft comprising:
an airframe forming a fuel cell compartment; and
a collapsible fuel cell disposed inside the fuel cell compartment, the fuel cell comprising:
an inner textile support substrate having an outer surface including one or more textile crease lines forming a fold pattern; and
an outer shell layer conforming to the outer surface of the textile support substrate to form the fuel cell, the fuel cell collapsible along the fold pattern formed by the one or more textile crease lines;
wherein, the textile support substrate has a first thickness at the one or more textile crease lines and a second thickness at uncreased regions of the textile support substrate, the second thickness greater than the first thickness.

* * * * *